(12) United States Patent  (10) Patent No.: US 7,830,357 B2
Kitaoka et al.  (45) Date of Patent: Nov. 9, 2010

(54) IMAGE DISPLAY DEVICE AND IMAGE DISPLAY SYSTEM

(75) Inventors: Yasuo Kitaoka, Osaka (JP); Kazuhisa Yamamoto, Osaka (JP); Hiromu Kitaura, Osaka (JP); Ken ichi Kasazumi, Osaka (JP)

(73) Assignee: Panasonic Corporation, Osaka (JP)

( * ) Notice: Subject to any disclaimer, the term of this patent is extended or adjusted under 35 U.S.C. 154(b) by 960 days.

(21) Appl. No.: 11/658,318

(22) PCT Filed: Jul. 27, 2005

(86) PCT No.: PCT/JP2005/013741

§ 371 (c)(1),
(2), (4) Date: Jan. 24, 2007

(87) PCT Pub. No.: WO2006/011515

PCT Pub. Date: Feb. 2, 2006

(65) Prior Publication Data

US 2009/0002265 A1 Jan. 1, 2009

(30) Foreign Application Priority Data

Jul. 28, 2004 (JP) .............................. 2004-219732

(51) Int. Cl.
*G09G 3/36* (2006.01)

(52) U.S. Cl. ........................ 345/102; 345/87; 345/204; 398/130

(58) Field of Classification Search ................ 398/172, 398/140, 135, 173, 182, 202, 130; 345/102, 345/204; 359/237
See application file for complete search history.

(56) References Cited

U.S. PATENT DOCUMENTS

| 5,193,201 | A | * | 3/1993 | Tymes ........................ 708/191 |
| 5,488,571 | A | * | 1/1996 | Jacobs et al. ................ 708/111 |
| 5,701,189 | A | * | 12/1997 | Koda et al. .................. 398/118 |
| 6,377,295 | B1 | | 4/2002 | Woodgate et al. |
| 7,213,254 | B2 | * | 5/2007 | Koplar et ...................... 725/23 |
| 2004/0117856 | A1 | * | 6/2004 | Barsoum et al. ............. 725/138 |

FOREIGN PATENT DOCUMENTS

| EP | 0 829 743 | 3/1998 |
| EP | 1 403 759 | 3/2004 |
| JP | 7-192589 | 7/1995 |
| JP | 8-271222 | 10/1996 |
| JP | 9-36805 | 2/1997 |
| JP | 10-56427 | 2/1998 |
| JP | 10-74994 | 3/1998 |

(Continued)

*Primary Examiner*—Amare Mengistu
*Assistant Examiner*—Koosha Sharifi
(74) *Attorney, Agent, or Firm*—Wenderoth, Lind & Ponack, L.L.P.

(57) ABSTRACT

An image display device and an image display system which can establish visible light communication without interfering with an image displayed at a predetermined frame rate are provided. A controller 12 controls a spatial light modulator in accordance with an image signal to display the image, and also modulates an intensity of a visible light output from a backlight 13 with a frequency higher than the frame rate of the image signal to have the visible light output from the backlight 13 carry additional information. A light receiver 15 receives the visible light and demodulates to extract the additional information. An additional information generator 16 outputs the additional information.

24 Claims, 19 Drawing Sheets

FOREIGN PATENT DOCUMENTS

| | | |
|---|---|---|
| JP | 10-115800 | 5/1998 |
| JP | 2000-344103 | 12/2000 |
| JP | 2001-285762 | 10/2001 |
| JP | 2002-527917 | 8/2002 |
| JP | 2003-330017 | 11/2003 |
| JP | 2004-64465 | 2/2004 |
| JP | 2004-163447 | 6/2004 |
| JP | 2004-184802 | 7/2004 |

* cited by examiner

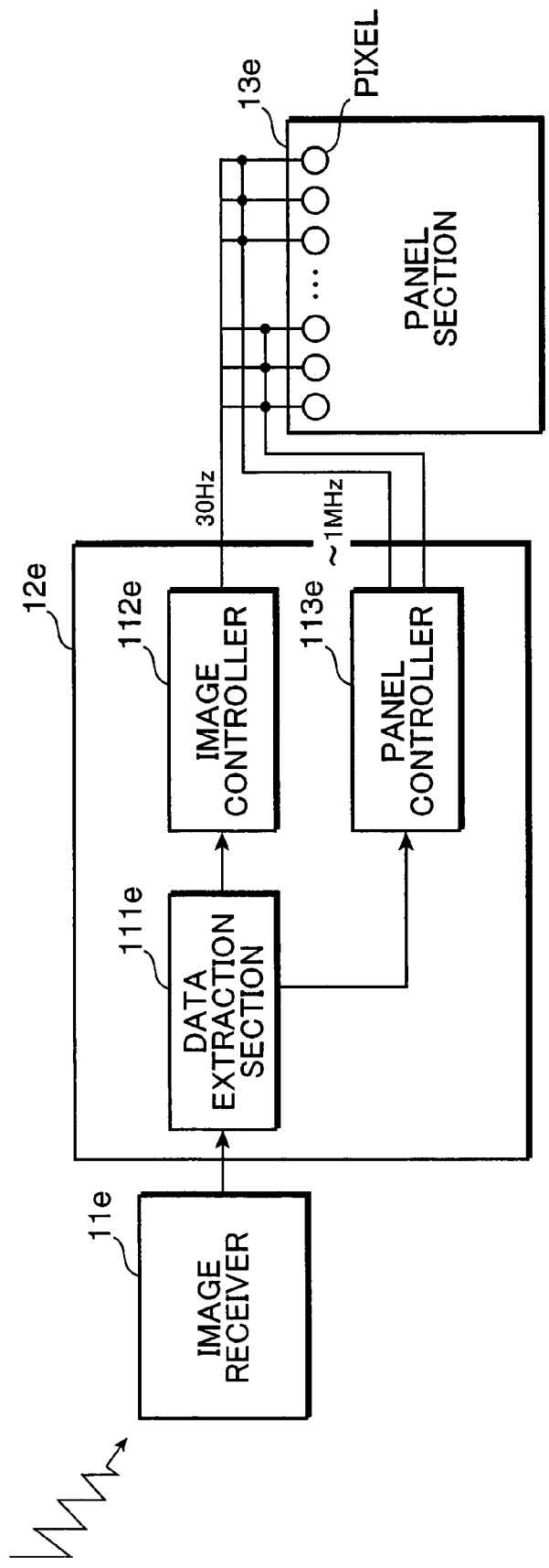

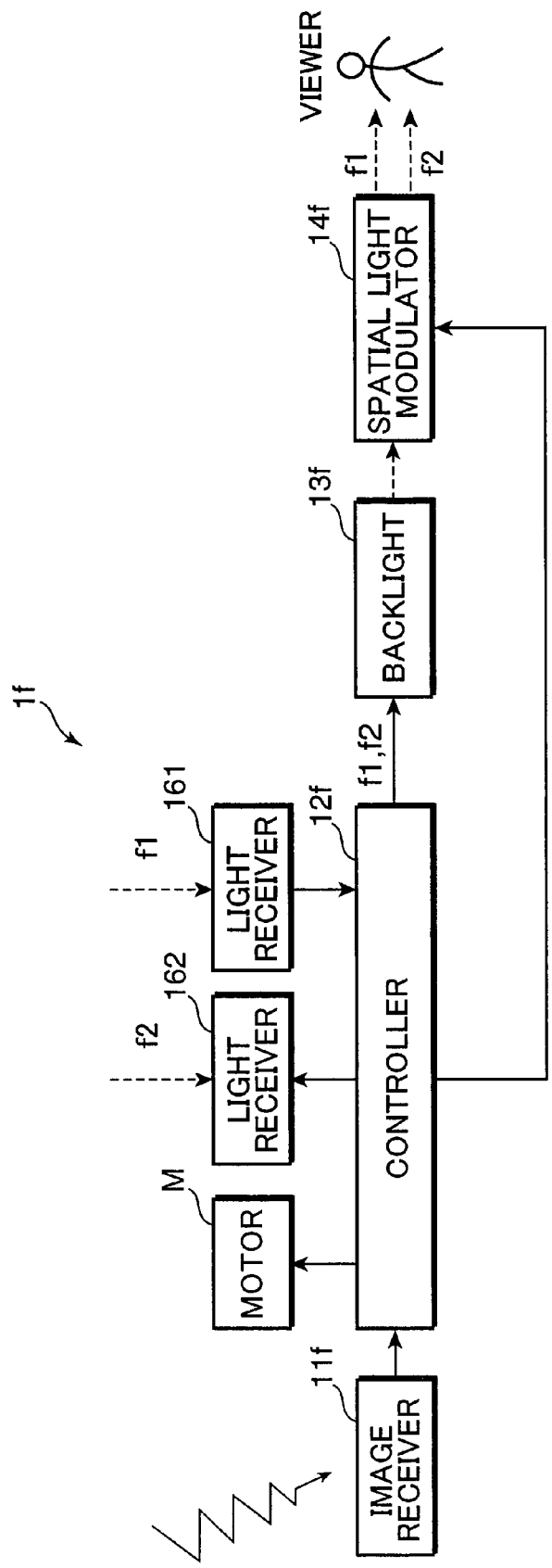

IMAGE DISPLAY DEVICE AND IMAGE DISPLAY SYSTEM

TECHNICAL FIELD

The present invention relates to image display devices, such as liquid crystal televisions, laser displays, organic EL displays and the like.

BACKGROUND ART

In recent years, use of digital equipment such as cellular phones, digital cameras, personal computers and the like has been spread significantly. Thus, technical development in data transmission among such equipment by using infrared radiations or visible lights has been pursued actively.

For example, Japanese Laid-Open Publication No. 10-56427 discloses a technique to transfer data from a personal computer or the like to a printer by using infrared radiation transmission. Japanese Laid-Open Publication No. 9-36805 discloses a system for performing data transmission between a public telephone and a cellular phone by using infrared radiations.

As a data transmission utilizing visible lights, Japanese National Phase PCT Laid-Open Publication No. 2002-527917 discloses a system for data communication among personal computers using visible lights emitted from LED dot matrix displays. Further, Japanese Laid-Open Publication No. 2000-344103 discloses a technique for optical transmission of various types of information such as vehicle velocity and the like to vehicles by using blue, read, and green visible light of a traffic signal.

Recently, more and more slim-type large-screen image display devices such as liquid crystal televisions, rear-projection type television, and organic EL displays have been replacing conventional CRT televisions. With such image display devices, additional information such as teletext broadcasting, program information and the like can be easily obtained.

DISCLOSURE OF THE INVENTION

However, in the conventional image display devices, such additional information is displayed only on a display portion of an image display device. The additional information has not been taken out from the image display device. Thus, there has been a problem that the additional information is restricted to the one which can be displayed on the image display device.

Further, transmitting additional information by using infrared radiations as in Japanese Laid-Open Publication Nos. 10-56427 and 9-36805 has a problem of a cost increase because communication means for the infrared radiation communication has to be additionally provided.

The technique disclosed in Japanese National Phase PCT Laid-Open Publication No. 2002-527917 is for visible light communication using LED dot matrix displays. However, the LED dot matrix displays disclosed in this document are those with a visible light communicating section for displaying characters, words, pictures, graphics and the like. A display device for displaying image of motion pictures such as television has not been used for the visible light communication.

In the technique disclosed in Japanese Laid-Open Publication No. 2000-344103, visible light communication is performed. However, this visible light communication utilizes visible lights of traffic lights, not those of a motion picture displaying section.

The image display device of the present invention is to provide an image display device and an image display system operable to perform visible light communication without interfering with an image displayed with a predetermined frame rate.

The image display device according to the present invention includes: a display section which includes a light source and displays an image based on visible light output from the light source; and a controller for displaying an image on the display section with a predetermined frame rate and also modulating an intensity of the visible light with a frequency higher than the frame rate of the visible light to carry predetermined information.

With such a structure, the intensity of the visible light output from the light source, which forms the display section, is modulated with the frequency higher than the frame rate of the image to be displayed on the display section. Thus, visible light communication having the image to be displayed carry the predetermined information can be realized. Further, since the visible light for displaying the image is used as a carrier, no separate light source or the like is required for sending predetermined information. Thus, the cost reduction and simplification of the device can be achieved.

BRIEF DESCRIPTION OF THE DRAWINGS

FIG. 13 is a diagram showing a detailed structure of a controller shown in FIG. 12.

FIG. 14 is a block diagram showing an image display device according to Embodiment 5.

BEST MODE FOR CARRYING OUT THE INVENTION

Hereinafter, the image display device according to the embodiments of the present invention will be described with reference to the drawings.

Embodiment 1

Backlight Display

Figure 1:
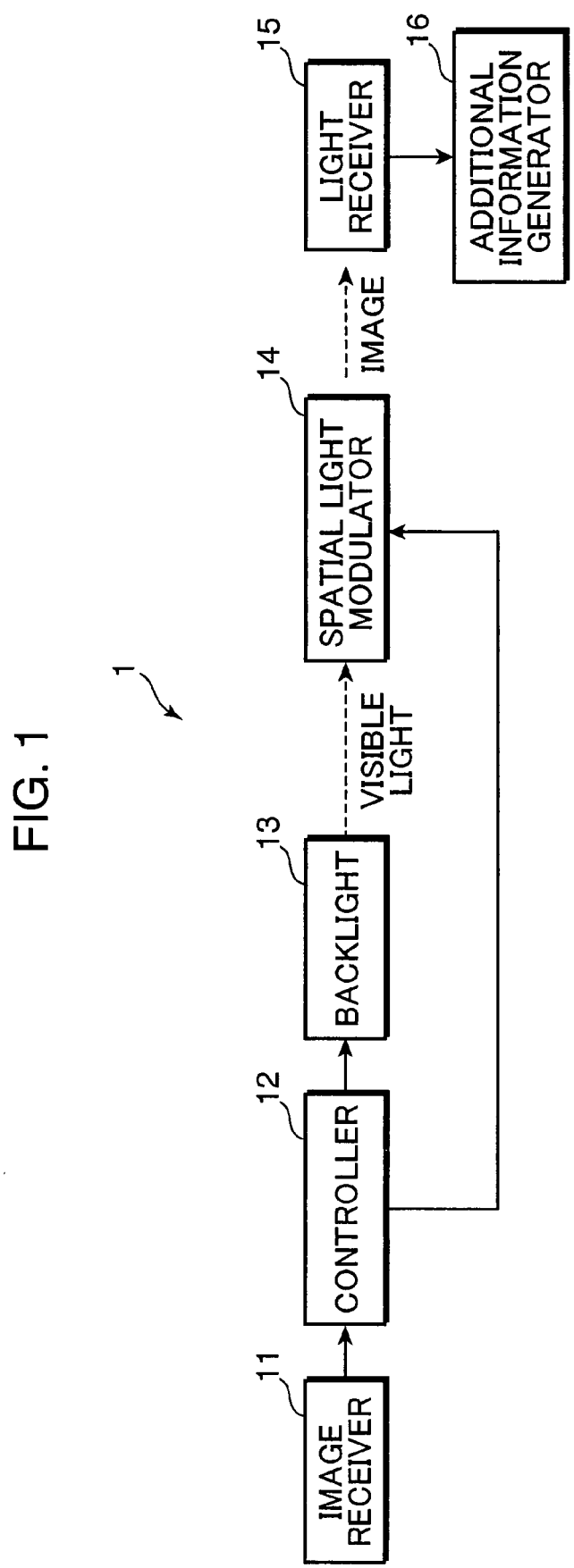
FIG. 1 is a diagram showing an entire structure of an image display system to which an image display device according to Embodiment 1 of the present invention is applied.

FIG. 1 is a diagram of an entire structure of an image display system to which an image display device according to Embodiment 1 of the present invention is applied. The image display system includes an image display device 1, a light receiver 15, and an additional information generator 16. The image display device 1 shown in FIG. 1 is an image display device such as a liquid crystal television, and includes an image receiver 11, a controller 12, a backlight 13, and a spatial light modulator 14. The image receiver 11 receives a radio wave of an image for television, which is sent from a broadcasting station, and demodulates it to extract a baseband signal to send it to the controller 12. Herein, the baseband signal includes an image signal, an audio signal, and additional signal.

The additional information includes program information, smell information, text information, audio information, stimulation information, pain information, multilingual information and the like. The program information includes information describing a program guide of television programs, and contents of the programs. The smell information is data sent by a broadcasting station with an image signal and an audio signal in order to describe the smell of the food featured in a cooking program or a program for a fine food lover, or to reproduce the smell by a device for reproducing smells. The pain information is data sent by a broadcasting station with an image signal and an audio signal in order to describe pain felt by a competitor in a martial arts program or a sports program. The multilingual information is audio information or text information describing translation of contents of conversation by performers when it is translated into another or other languages. Herein, the additional information may include text information describing the contents of conversation included in the audio signal.

The controller 12 separates the image signal, audio signal, and the additional information from the baseband signal. The controller 12 controls the spatial light modulator 14 in accordance with the image signal to display an image, and has a speaker (not shown) output audio in accordance with the audio signal. The controller 12 modulates the intensity of the backlight 13 so that a visible light output from the backlight 13 carries the additional information.

The backlight 13 is formed of white color light emitting diodes including three light emitting diodes which respectively emit light of blue, green and red. The backlight 13 outputs the visible light carrying the additional information to the spatial light modulator 14 under control by the controller 12.

The spatial light modulator 14 is formed of a liquid crystal panel of active matrix type. The spatial light modulator 14 adjusts an amount of light transmission for each of pixels in accordance with the image signal and displays an image under control by the controller 12.

The light receiver 15 is formed of PIN photodiodes of Si, avalanche photodiodes with high sensitivity or the like. The light receiver 15 receives the visible light of the image displayed by the spatial light modulator 14, and demodulates the received visible light to extract the additional information carried by the visible light.

The additional information generator 16 is formed of an audio reproduction device, such as speakers, headphones and the like, a display device, a smell reproducing device, and the like. The additional information generator 16 outputs the additional information extracted by the light receiver 15. As the display device, for example, a display device having a size of about the display portion of a cellular phone may be employed. The smell reproducing device is a device for reproducing smell in accordance with the smell information. The additional information generator 16 may be formed as a dedicated device by incorporating at least one of the speaker, the display device, and the smell reproduction device into a case like a remote controller of a television with the light receiver 15, or it may be formed by incorporating at least one of the speaker and the smell reproduction device into a remote controller of a television including a display device with the light receiver 15.

Further, the stimulation information may be included in the additional information, and a haptic device may be employed in the additional information generator 16 to transmit the stimulation to a viewer by driving the haptic device in accordance with the stimulation information.

Figure 2:
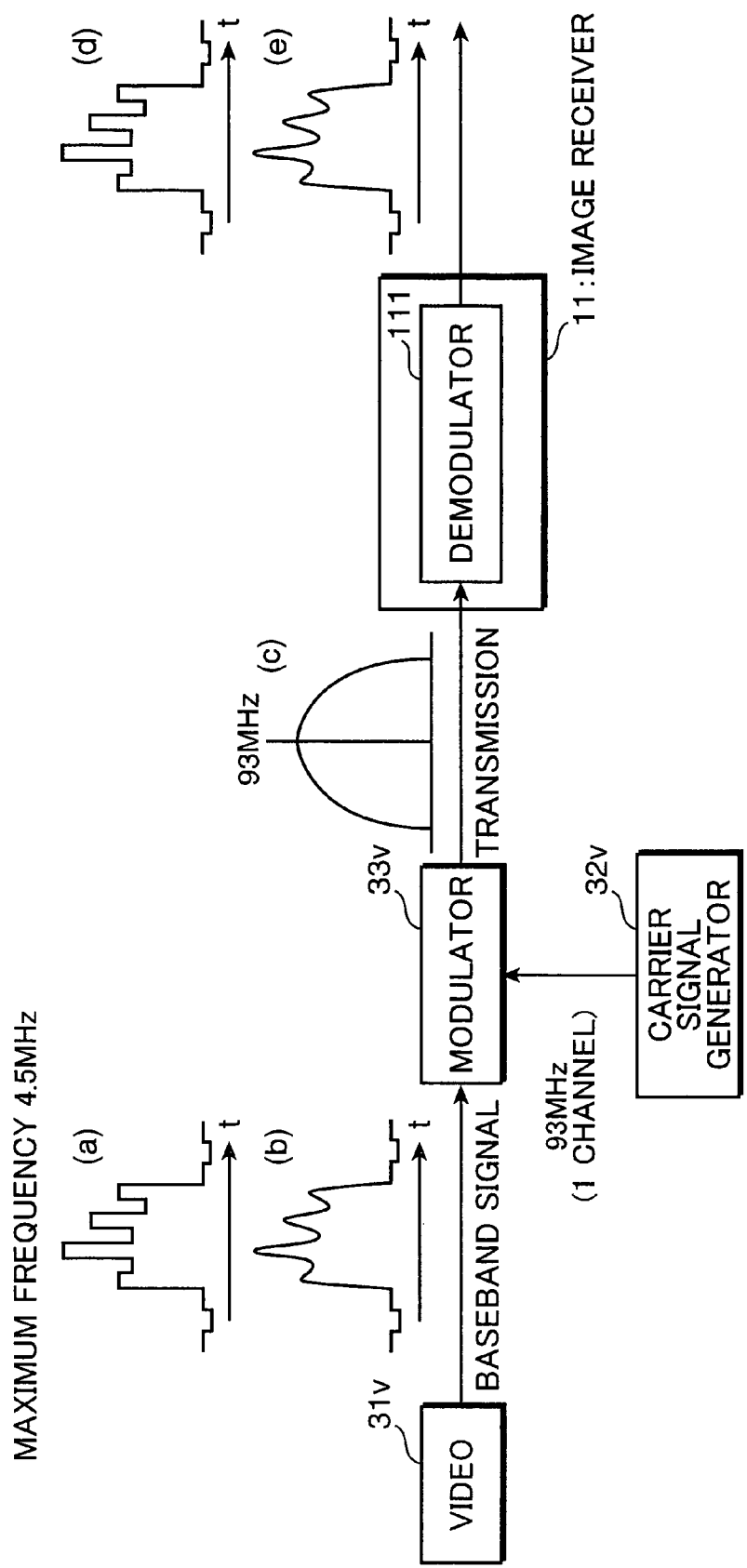
FIG. 2 is a diagram showing an exemplary transmitting system for transmitting a radio wave to an image receiver shown in FIG. 1.

FIG. 2 is a diagram showing an example of a transmission system for transmitting a radio wave to the image receiver 11 shown in FIG. 1. As shown in FIG. 2, the transmission system includes a video 31v, a carrier signal generator 32v and a modulator 33v.

The video 31v outputs a baseband signal which includes an analog or digital image signal which uses a frequency band from 0 to 4.5 MHz, an audio signal which uses a frequency band which is higher than the frequency band of the image signal, and additional information uses a frequency band higher than the frequency band of the audio signal, to the modulator 33v. Herein, when the baseband signal is a digital signal, a change of the image signal included in the baseband signal over time may draw a line as denoted by (a). It can be seen that the image signal experiences a step change. When the baseband signal is an analog signal, the change of the image signal included in the baseband signal over time may draw a line as denoted by (b). It can be seen that the image signal continuously changes.

The carrier signal generator 32v is an oscillation circuit for generating a carrier signal of a predetermined frequency (for example, 93 MHz). The modulator 33v modulates the carrier signal generated by the carrier signal generator 32v with the baseband signal output from the video 31v, and outputs the modulated carrier signal as a radio wave from an antenna which is not shown to a demodulator 111. A frequency property of the modulated baseband signal may draw a line as denoted (c), for example. It can be seen that the baseband signal modulated as shown by (c) has a waveform of a bell shape symmetrical in a lateral direction with 93 MHz being a center since the frequency of the carrier signal is 93 MHz.

The demodulator 111 of the image receiver 11 demodulates the radio wave sent from the modulator 33v, and extracts the baseband signal to output to the controller 12. Herein, when the baseband signal is a digital signal, a change of the image signal included in the baseband signal over time may draw a line as denoted by (d), for example. It can be seen that a digital image signal similar to that denoted by (a) is extracted. When the baseband signal is an analog signal, the change of the image signal included in the baseband signal over time may draw a line as denoted by (e), for example. It can be seen that a digital image signal similar to that denoted by (b) is extracted.

Figure 3:
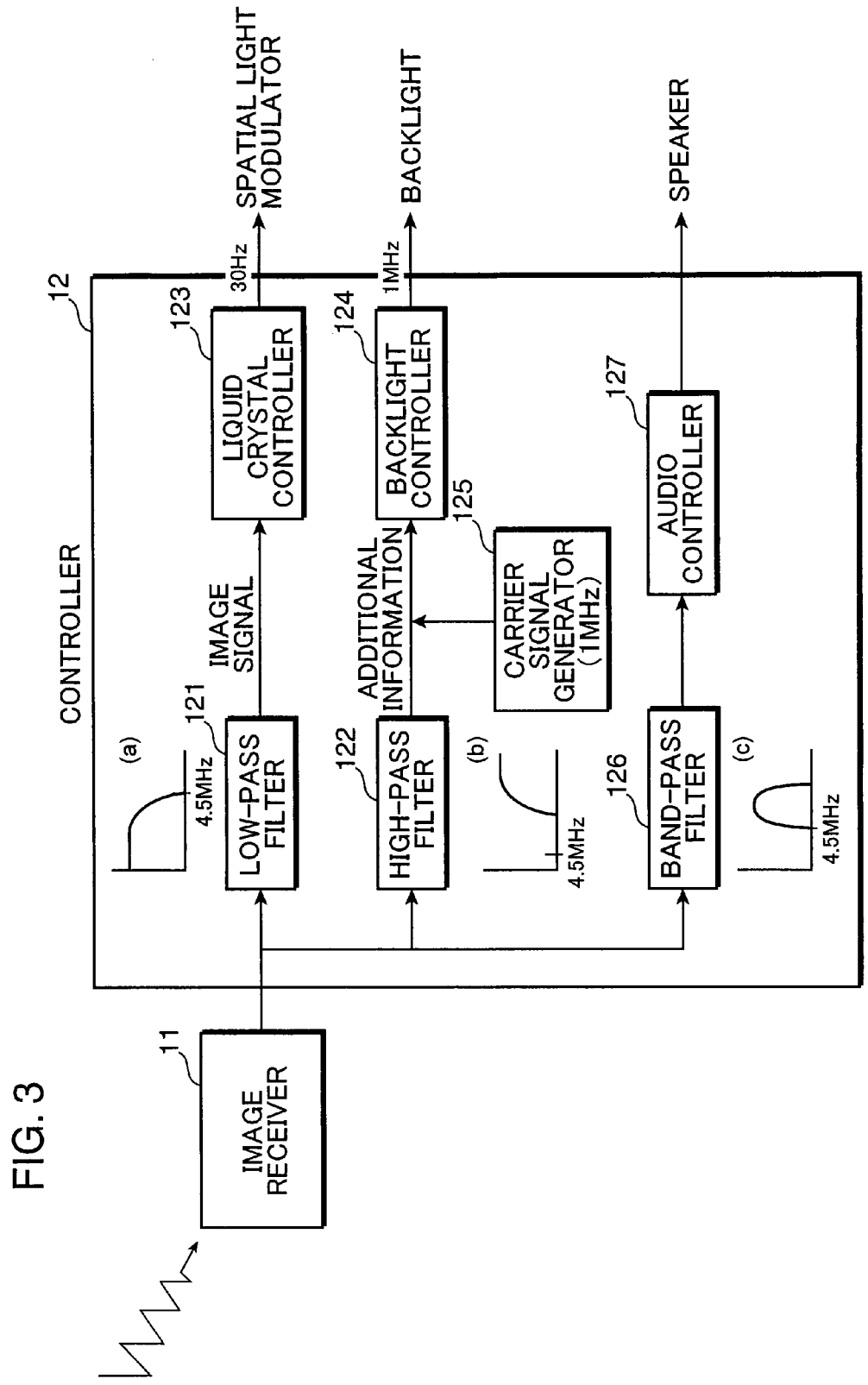
FIG. 3 is a block diagram showing a detailed structure of a controller for processing an analog baseband signal.

FIG. 3 is a block diagram showing a detailed structure of the controller 12 for processing an analog baseband signal. As shown in FIG. 3, the controller 12 includes a low-pass filter 121, a high-pass filter 122, a liquid crystal controller 123, a backlight controller 124, a carrier signal generator 125, a band-pass filter 126, and an audio controller 127.

The low-pass filter 121 has a characteristic to pass a signal having a frequency which does not exceed 4.5 MHz, the maximum frequency of the image signal as indicated by (a). The low-pass filter 121 extracts the image signal from the baseband signal output from the image receiver 11 to output to the liquid crystal controller 123. The band-pass filter 126 has a characteristic to pass an audio signal which has a predetermined frequency band and which is not smaller than 4.5 MHz, the maximum frequency of the image signal as denoted by (c). The band-pass filter 126 extracts the audio signal from the baseband signal output from the image receiver 11 and outputs it to the audio controller 127.

The high pass filter 122 has a characteristic to pass a signal having a frequency not smaller than the maximum frequency of the audio signal as denoted by (b). The high pass filter 122 extracts the additional information from the baseband signal output from the image receiver 11, and outputs it to the backlight controller 124.

In this way, the baseband signal is separated into the image signal, the audio signal, and the additional information.

The carrier signal generator 125 is an oscillation circuit for generating a carrier signal of 1 MHz. The backlight controller 124 modulates the carrier signal generated by the carrier signal generator 125 with the additional information output from the high-pass filter 122. The backlight controller 124 drives light emitting diodes which form the backlight 13 with the modulated signal and has the backlight 13 output a visible light. In this way, the visible light carrying the additional information is output from the backlight 13. Herein, it is not always necessary to modulate all of the light emitting diodes. Modulating any one of light emitting diodes of three colors, blue, green, and red may be sufficient. For example, when only the green light emitting diode is modulated, the additional information can be received more securely if a filter transmitting green light is inserted in front of the light receiver 15 shown in FIG. 2.

The liquid crystal controller 123 controls the spatial light modulator 14 in accordance with the image signal, and has the spatial light modulator 14 display the image. The image signal is output at 30 frames/second. The additional information is modulated with 1 MHz, which is a frequency higher than 30 frames/second. Thus, the additional information does not affect the image displayed by the spatial light modulator 14. The audio controller 127 includes an amplifier for adjusting a gain of an audio signal in accordance with an instruction operation from a viewer, and the like. The audio controller 127 adjusts a gain of the audio signal output from the band-pass filter 126 to output to the speaker.

Figure 4:
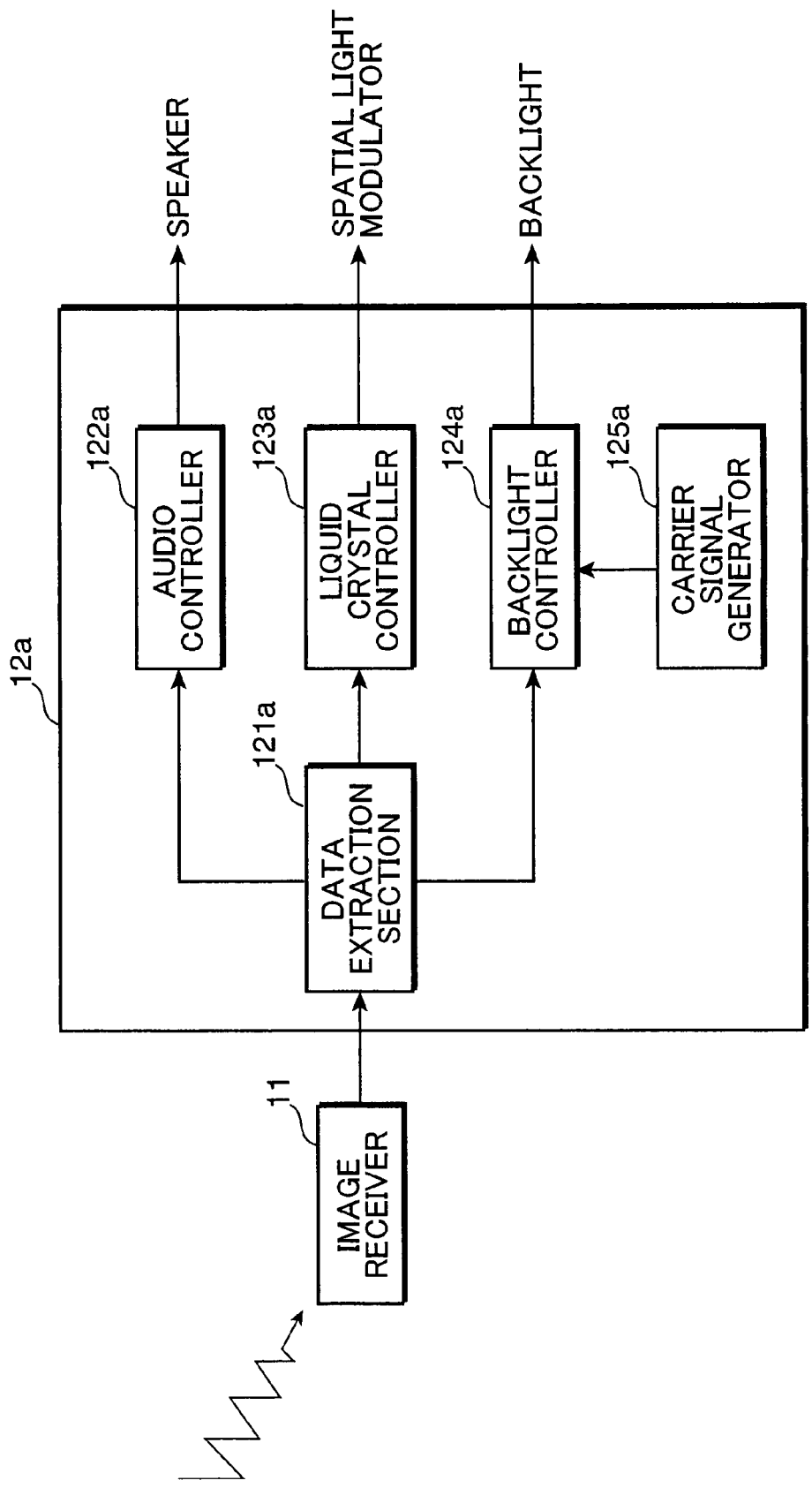
FIG. 4 is a block diagram showing a detailed structure of a controller for processing a digital baseband signal.

When the video receiver 11 is a video receiver 11 of a digital type, a controller 12a for processing a digital baseband signal as shown in FIG. 4 may be employed instead of the controller 12 for processing an analog baseband signal as shown in FIG. 3. FIG. 4 is a block diagram showing a detailed structure of the controller 12a for processing a digital baseband signal. The controller 12a includes a data extraction section 121a, an audio controller 122a, a liquid crystal controller 123a, a backlight controller 124a, and a carrier signal generator 125a.

The data extraction section 121a extracts the image signal, the audio signal, and the additional information from the digital baseband signal output from the video receiver 11. The audio controller 122a outputs the audio signal extracted by the data extraction section 121a from a speaker. The liquid crystal controller 123a controls an amount of light transmission of each of the pixels forming the spatial light modulator 14 in accordance with the image signal extracted by the data extraction section 121a, and has the spatial light modulator 14 display the image.

The carrier signal generator 125a is an oscillation circuit for generating a carrier signal of 1 MHz. The backlight controller 124a samples the additional information extracted by the data extraction section 121a in an interval of 1 kHz. The backlight controller 124a modulates the carrier signal generated by the carrier signal generator 125a with the sampled additional information to generate a modulation signal, and drives the backlight 13 with the modulated signal.

Figure 5:
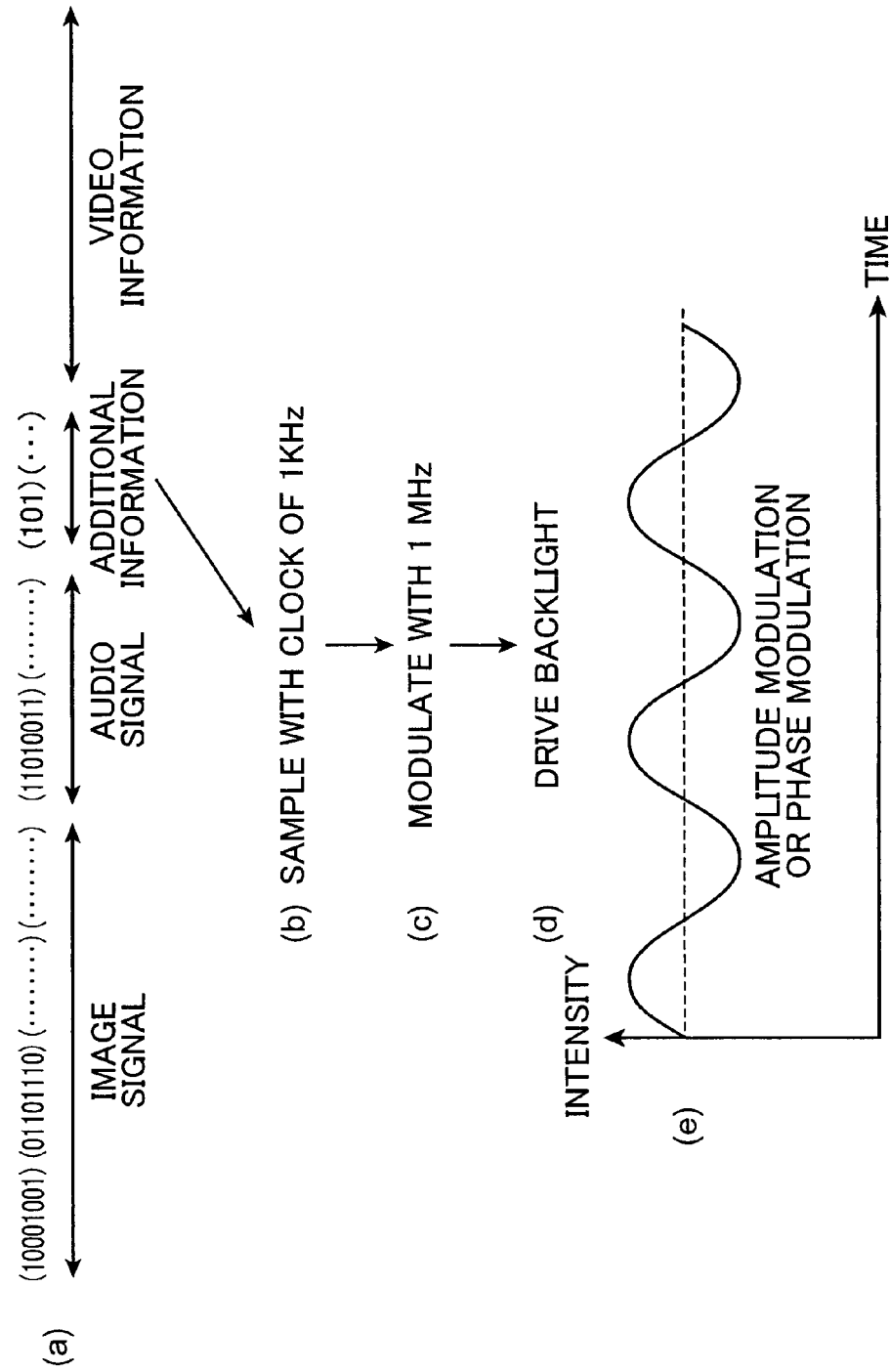
FIG. 5 is a diagram showing a flow of a process by the controller shown in FIG. 4.

FIG. 5 is a diagram showing a flow of a process by the controller 12a. As shown by (a), the digital baseband signal output from the video receiver 11 includes the image signal, the audio signal, and the additional information. The additional information as denoted by (a) is extracted by the data extraction section 121a. At (b), the additional information is sampled in an interval of 1 kHz. At (c), the carrier signal of 1 MHz is amplitude-modulated, or phase-modulated. The modulated signal is used to drive the backlight 13. The backlight 13 outputs a visible light which is a sinusoidal wave of 1 MHz which is amplitude-modulated, or phase-modulated with a certain intensity level being a center as shown by (d). Thus, the visible light output from the backlight 13 carry the additional information.

Next, an operation of the image display device 1 according to the present embodiment will be described with reference to FIG. 1. When the video receiver 11 outputs an image signal of 1H (horizontal scanning), the controller 12 switches a TFT (thin film transistor) included in the spatial light modulator 14. The controller 12 applies a driving voltage in accordance with the image signal to each of the pixels, and changes an amount of light transmission of each of the pixels.

The driving voltage is represented by, for example, 8 bit (256 gradation). In an image display device employing a normal liquid crystal panel, a backlight formed of light emitting diodes is always turned on without being modulated. However, in the image display device 1, the backlight 13 is driven by the carrier signal of 1 MHz which is modulated with the additional information. A frequency of the carrier signal is 1 MHz, which is a frequency higher than 30 frames/second, the frame rate of the image signal. Thus, even when the additional information is carried by the visible light output from the backlight 13, the image displayed by the spatial light modulator 14 is not affected, and a human watching the image can see the image same as in continuous emission of light.

In this example, the frequency of the carrier signal is 1 MHz. However, the frequency is not limited to such a frequency, but may bee any frequency as long as it is higher than 30 frames/second, the frame rate of the image signal. For example, it may be about 1 kHz. The frequency is preferably not smaller than 1 kHz, and more preferably, not smaller than 10 kHz. On the other hand, when the additional information is modulated such that an average output of the backlight 13 becomes constant, the frequency of the carrier signal is preferably 10 MHz or lower, and more preferably, 1 MHz or lower since a cutoff frequency of the light emitting diode is about 100 MHz. Thus, in the present embodiment, 1 MHz is employed as the modulation frequency.

The visible light representing the image displayed by the spatial light modulator 14 is first received by the light receiver 15. Then, the visible light is demodulated to extract the additional information and is output to the additional information generator 16. When the additional information is smell information, the additional information generator 16 reproduces smell by the smell reproducing device, or has the display device display texts describing the smell. When the additional information is pain information, the additional information generator 16 has the display device display texts describing the pain. When the additional information is multilingual information, the additional information generator 16 has the speaker output the audio information describing the translated content, or has the display device display texts describing the translated content. When the additional information is stimulation information, the additional information generator 16 drives the haptic device. When the additional information is program information, the additional information generator 16 has the display device display texts describing the smell.

As described above, according to the image display device of the present embodiment, the additional information can be extracted from the image signal received by the image receiver 11. The carrier signal of 1 MHz is modulated with the extracted additional information. The obtained modulated signal is used to drive the backlight 13. Thus, the visible light from the backlight 13 carries the additional information, and the visible light for showing the image to be displayed on the spatial light modulator 14 includes the additional information. Therefore, when the visible light representing the image is received by the light receiver 15 and is modulated, the additional information can be extracted from the visible light. In this way, the visible light communication using the video display device such as televisions can be realized.

Further, according to the present image display device, the visible light which is a backlight is used as a carrier wave. Thus, there is no need to attach a new infrared radiation transmitter in order to send the additional information, and the additional information sent with the image signal can be sent. Thus, the device can be much simplified and the cost can be reduced.

For showing a black scene, the spatial light modulator 14 does not transmit light. Thus, the light receiver 15 cannot receive the visible light, and cannot send the additional information. Therefore, for showing a black scene, it is preferable that the liquid crystal controller 123a controls the spatial light modulator 14 so as to transmit a certain amount of the visible light such that the intensity of the visible light which transmits through the spatial light modulator 14 does not become the intensity which cannot be detected by the light receiver 15 or lower. Further, as the backlight 13, organic EL (electro luminescence) may be employed instead of the light emitting diodes.

Embodiment 2

Laser Display

Figure 6:
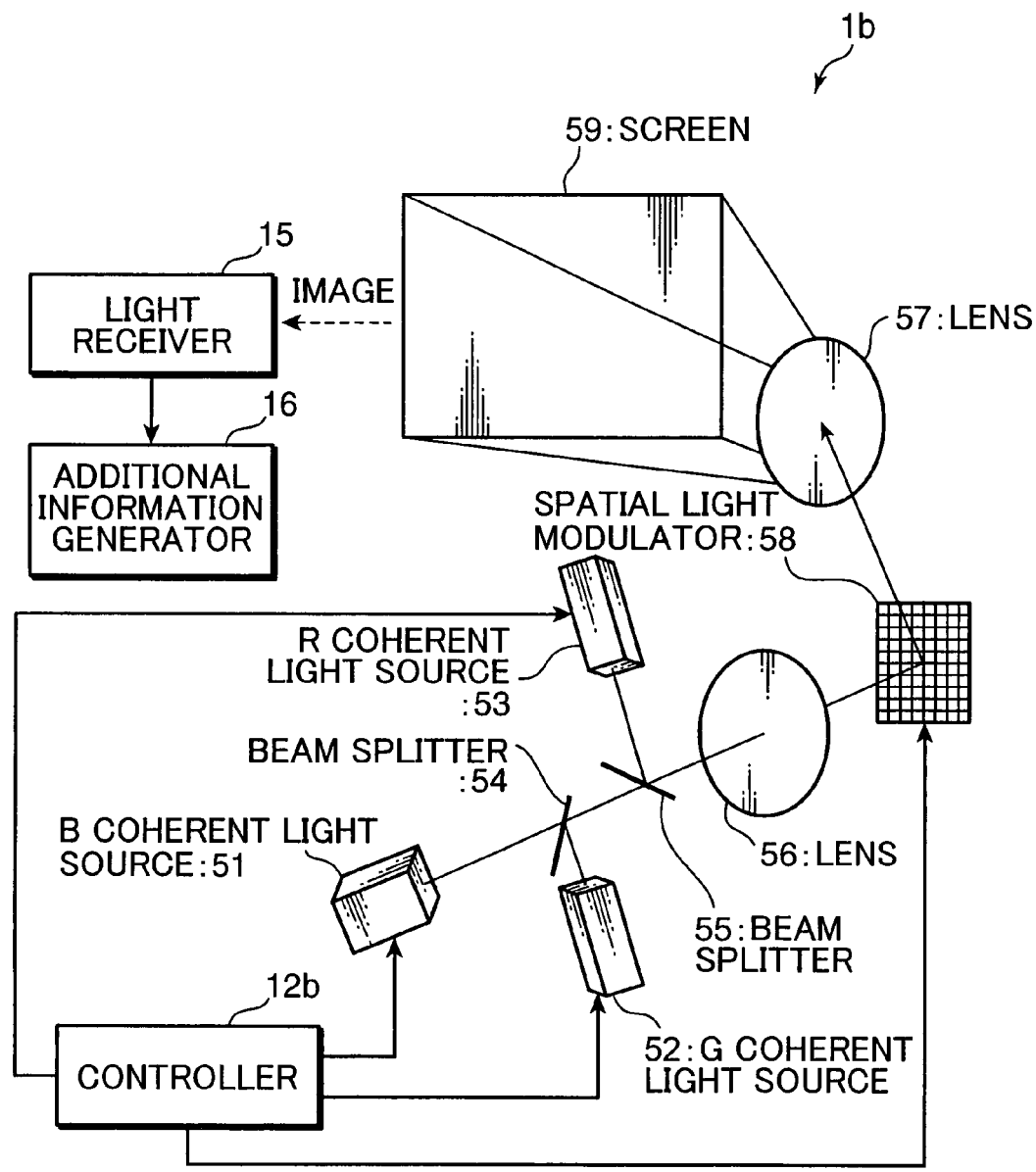
FIG. 6 is a diagram showing an entire structure of an image display system to which an image display device according to Embodiment 2 of the present invention is applied.

Next, an image display device according to Embodiment 2, in which the image display device of the present invention is applied to a laser display, will be described. FIG. 6 is a diagram showing an entire structure of an image display system to which an image display device 1b of Embodiment 2 is applied. The image display system includes an image display device 1b, a light receiver 15, and an additional information generator 16. Components same as those in Embodiment 1 are denoted by the same reference numerals, and will not be described further. The image display device 1b includes a blue coherent light source (hereinafter, referred to as B coherent light source) 51, a green coherent light source (hereinafter, referred to as G coherent light source) 52, a red coherent light source (hereinafter, referred to as R coherent light source) 53, two beam splitters 54 and 55, two lenses 56 and 57, a spatial light modulator 58, a screen 59, and a controller 12b.

The B coherent light source 51 and the G coherent light source 52 are formed of GaN semiconductor laser, and respectively output a blue laser beam having a central wavelength of 410 to 480 nm (hereinafter, referred to as B laser beam), and a green laser beam having a central wavelength of 500 to 550 nm (hereinafter, referred to as G laser beam). The R coherent light source 53 is formed of AlGaInP semiconductor laser, and outputs a red laser beam having a central wavelength of 610 to 670 nm (hereinafter, referred to as R laser beam). The beam splitter 54 multiplexes the B laser beam output from the B coherent light source 51 and the G laser beam output from the G coherent light source 52 and guides to the beam splitter 55.

The beam splitter 55 multiplexes the laser beam multiplexed by the beam splitter 54 and the R laser beam output from the R coherent light source 53, and guides to the lens 56. The three laser beams output from the B through R coherent light sources 51 through 53 are multiplexed into one laser beam and becomes white light.

The lens 56 guides the white laser beam multiplexed by the beam splitter 55 to the spatial light modulator 58. The spatial light modulator 58 is formed of a DMD (Digital Micro-mirror Device). The DMD is formed of a few millions of ultramicro mirrors (each corresponding to one pixel and having the size of about 17 μm) spread over a CMOS semiconductor device in a matrix pattern, which operate independently at high speed. The laser beam reflected off the ultramicro mirrors is projected on the screen 59 via the lens 57.

The lens 57 guides the laser beam reflected off the spatial light modulator 58 to the screen 59. The screen 59 displays the image represented by the laser beam reflected off the spatial light modulator 58.

Figure 7:
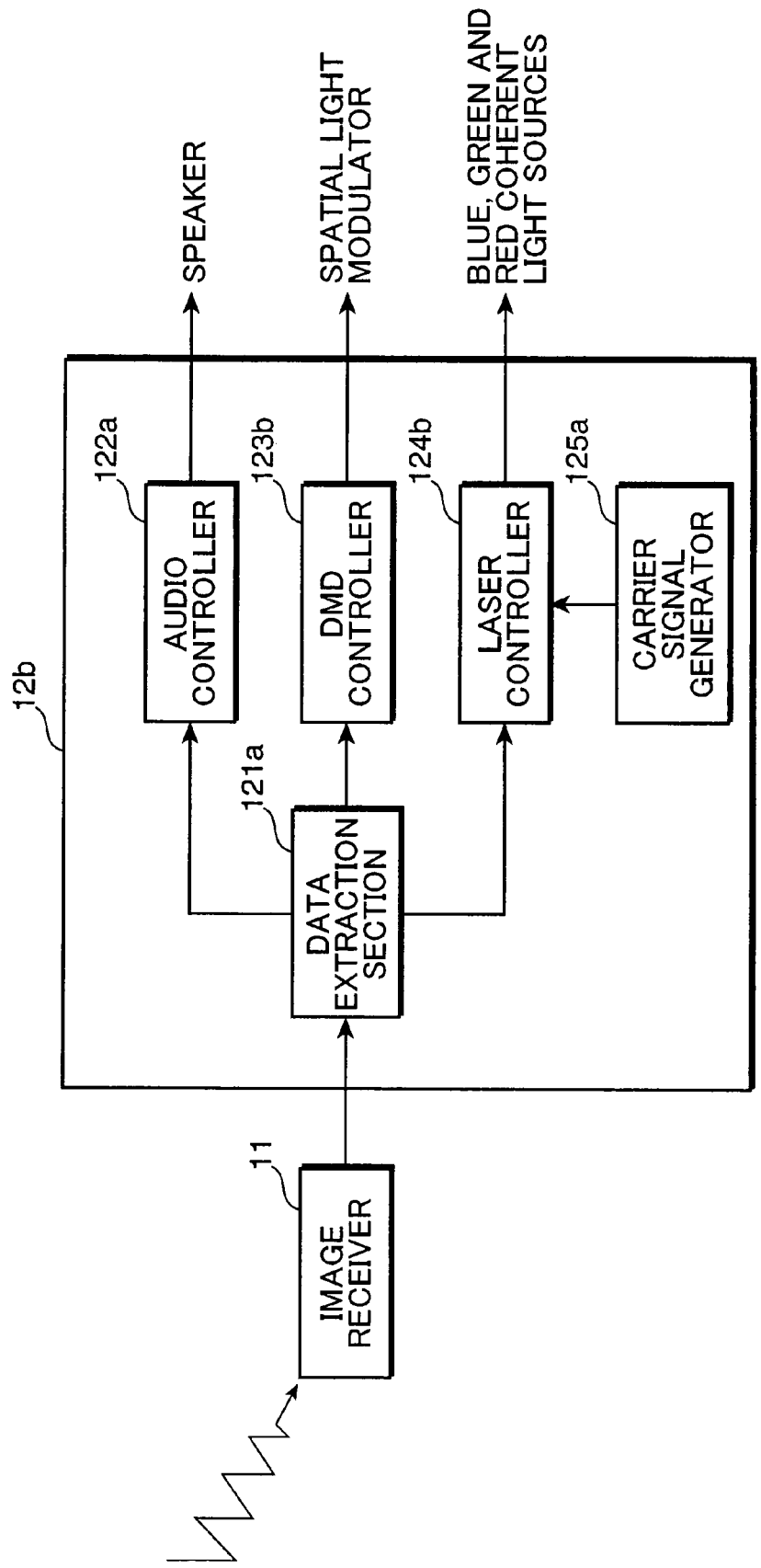
FIG. 7 is a block diagram showing a detailed structure of the controller shown in FIG. 6.

The controller 12b controls the entire image display device 1b. FIG. 7 is a block diagram showing a detailed structure of the controller 12b shown in FIG. 6. In FIG. 7, components same as those of the controller 12a of the image display device 1 according to Embodiment 1 (FIG. 4) are denoted by the same reference numerals, and will not be described further. A feature of the controller 12b is that it includes a DMD controller 123b instead of the liquid crystal controller 124a, and includes a laser controller 124b instead of the backlight controller 124a.

The DMD controller 123b tilts the ultramicro mirrors forming the DMD, which is the spatial light modulator 58, in accordance with the image signal extracted by the data extraction section 121a and displays the image on the screen 59. The laser controller 124b samples in an interval of 1 kHz the additional information extracted by the data extraction section 121a. The laser controller 124b modulates the carrier signal generated by the carrier signal generator 125a with the sampled additional information to generate a modulated signal, and drives the B through R coherent light sources 51 through 53 with the modulated signal. In this way, the additional information is carried by the B through G laser beams.

All the B through R coherent light sources 51 through 53 may be driven with the modulated signals so that all the blue, green, and red laser beams carry the additional information. Alternatively, two of the coherent light sources may be driven with the modulated signal so that two laser beams carry the additional information, or only one coherent light source may be driven by the modulated signal so that one laser beam carries the additional information. For example, when the additional information is carried by only the G laser beam, the additional information can be more precisely received if a filter which transmits only green light is inserted in front of the light receiver 15.

As described above, according to the image display device 1b of Embodiment 2, visible light communication using a laser display can be realized as in the image display device 1 of Embodiment 1. Moreover, the modulator region of a semiconductor laser can be higher than the modulator region of the light emitting diodes. Thus, the carrier signal generator 125a can generate a carrier signal having a frequency higher than 1 MHz. This allows higher speed visible light communication, and more additional information can be included in the visible light.

Figure 8:
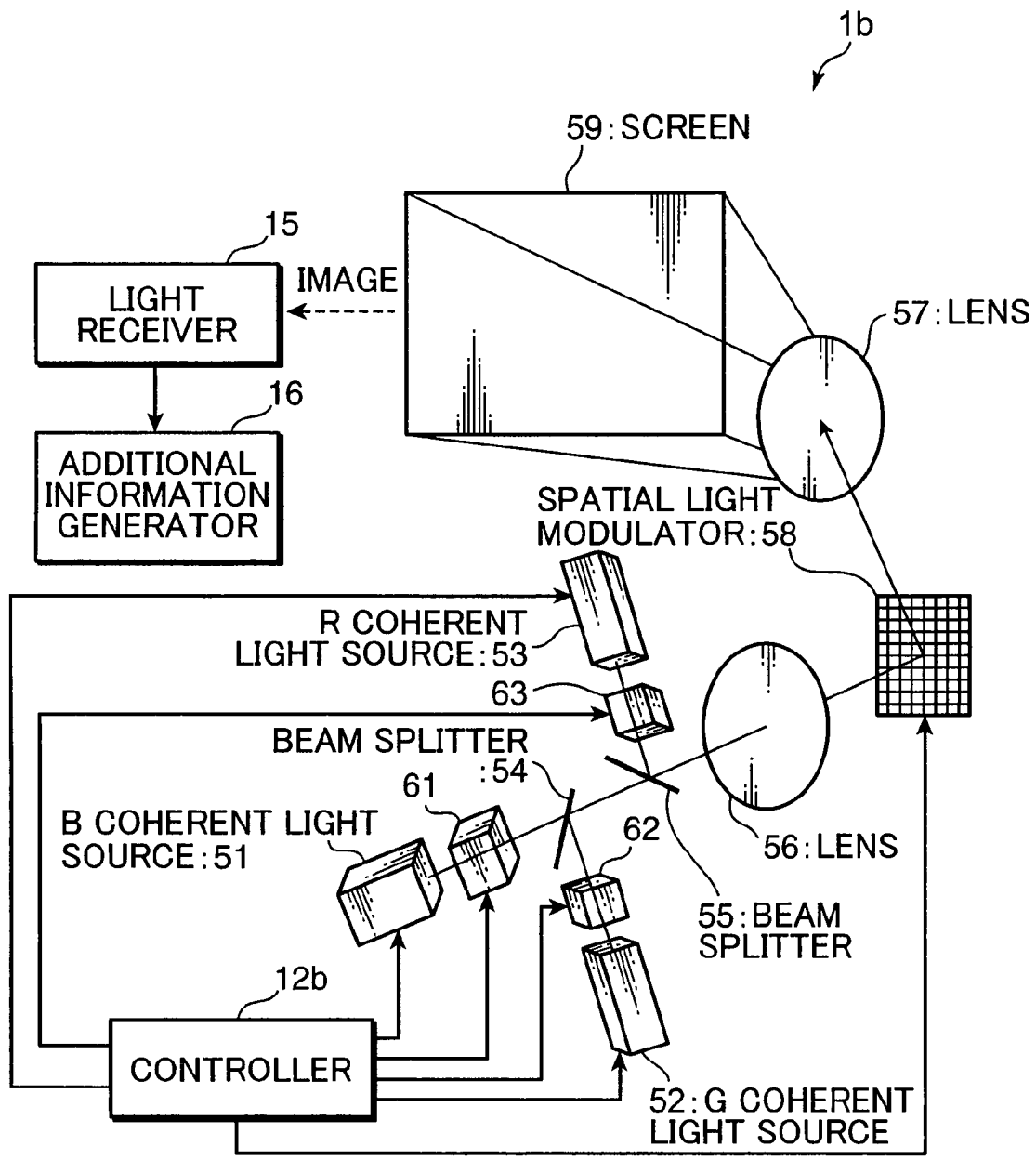
FIG. 8 is a diagram showing an entire structure of an image display system to which an image display device employing gas lasers as coherent light sources is applied.

In the present embodiment, semiconductor lasers are employed as the B through R coherent light sources 51 through 53. However, the present invention is not limited to such an example, and gas lasers may be employed. In such a case, as shown in FIG. 8, an external modulation element 61 for externally modulating the B laser beam may be provided on an optical path of the laser beam between the B coherent light source 51 and the beam splitter 54. An external modulation element 62 for externally modulating the G laser beam may be provided between the G coherent light source 52 and the beam splitter 54. An external modulation element 63 for externally modulating the R laser beam may be provided between the R coherent light source 53 and the beam splitter 55.

As the external modulation elements 61 through 63, an acousto-optic modulator (AOM), a magnet optic modulator (MOM), an electro-optics modulator (EOM) may be employed.

The controller 12b may output the control signal having a level in accordance with the additional information to the external modulation elements 61 through 63, and modulate the B, G, and R laser beams such that the B, G, and R laser beams carry the additional information. In such a case, one or two of the B, G, and R coherent light sources 51 through 53 may be formed of a semiconductor laser, and the rest of the coherent light sources may be formed of a gas laser. In such a structure, the rest of light sources require an external modulation element.

Further, as the B through R coherent light sources 51 through 53, coherent light sources of wavelength conversion type may be employed. The coherent light sources of wavelength conversion type means the light sources which emit high power laser beam to a nonlinear optical crystal and generates a second harmonic to obtain coherent light of a short wavelength. As methods for generating a second harmonic, a bulk method of performing wavelength conversion by emitting a fundamental wave light into a crystal itself, a waveguide method of creating a waveguide inside a crystal and performing wavelength conversion in the waveguide, and the like are known. In the present invention, any method may be employed.

The coherent light source of a wavelength conversion type of a bulk method is formed of a pumping semiconductor laser, a solid laser medium, a wavelength conversion element, and an output mirror. The solid laser medium may be, for example, Nd: YAG, Nd:YVO4 or the like. The wavelength conversion element may be, for example, QPM (quasi-phase matching)-SHG (second harmonic generator) element or the like.

Instead of DMD, LCOS (liquid crystal on silicon) formed of ferroelectric liquid crystal may be used for realizing a similar structure. Further, the spatial light modulator 58 may be a liquid crystal spatial light modulator of a transmission type which is formed of a high-temperature polysilicon instead of the spatial light modulator or a reflective type.

Embodiment 3

Visible Light Communication Among Image Display Devices

Figure 9:
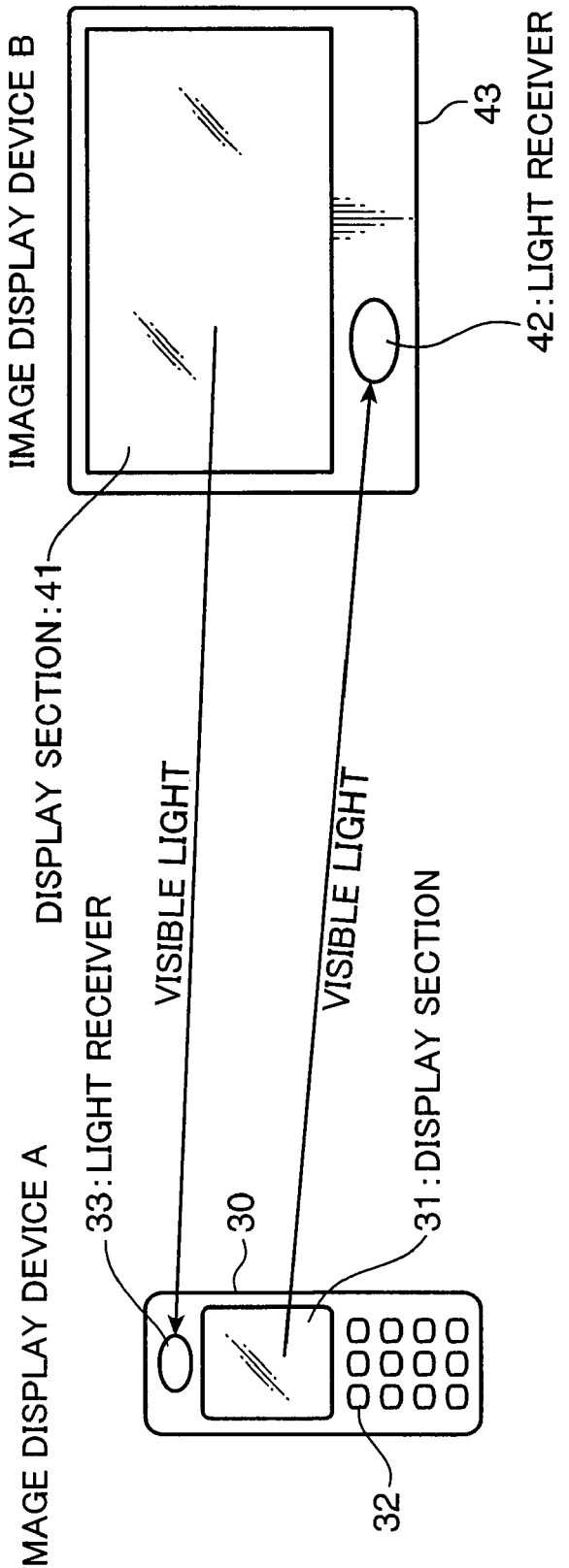
FIG. 9 is a diagram showing an entire structure of an image display system to which an image display device according to Embodiment 3 of the present invention is applied.

Next, an image display device according to Embodiment 3 will be described. A feature of the image display device of Embodiment 3 is that a light receiver is provided within the image display device itself, and visible light communication can be established among the image display devices. FIG. 9 is a diagram showing a structure of an image display system to which the image display device of Embodiment 3 is applied. The image display system shown in FIG. 9 includes an image display device A and an image display device B. The image display device A may be a remote controller of a television, a cellular phone, PDA, or the like, and includes a display section 31, an operation section 32, and a light receiver 33. In the following description, an example in which the image display device A is applied to a cellular phone and the image display device B is applied to a television is used for description. The image display device B is the image display device 1 of Embodiment 1 which includes a light receiver 42.

Figure 10:
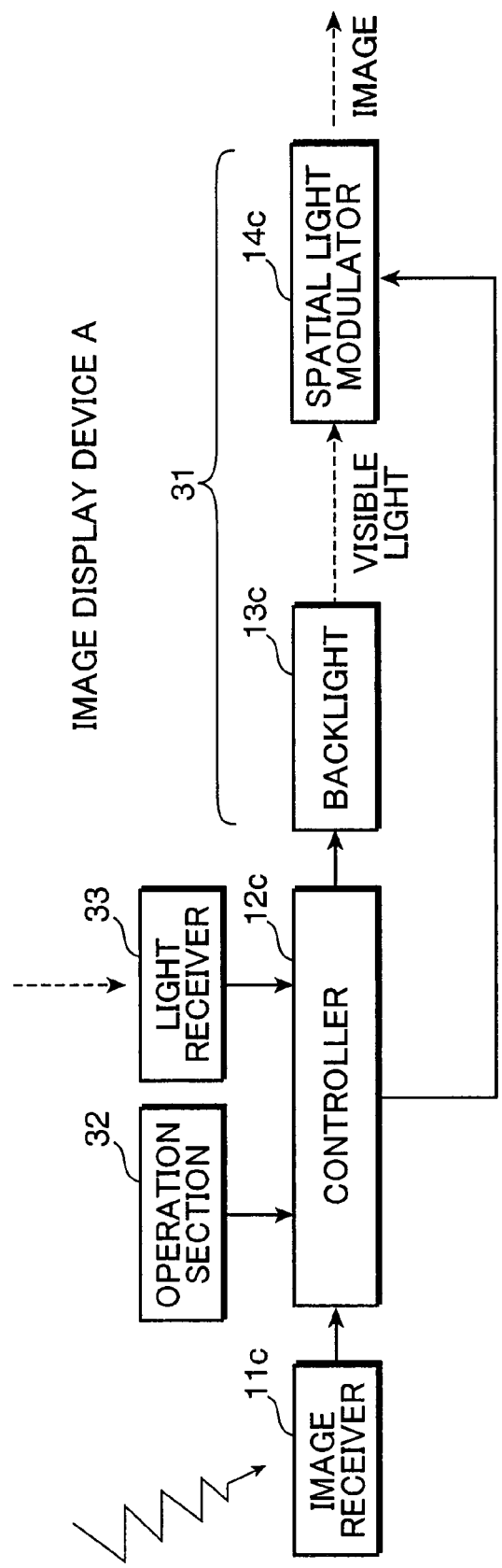
FIG. 10 is a block diagram of an image display device A shown in FIG. 9.

FIG. 10 is a block diagram of the image display device A. The image display device A includes an image receiver 11c, a controller 12c, a backlight 13c, a spatial light modulator 14c, the operation section 32, and the light receiver 33.

The operation section 32 is formed of a power button, numeric keys and the like, and receives various operational instructions from a viewer. The light receiver 33 receives a visible light for showing an image to be displayed by the image display device B, demodulates the received visible light, and extracts the additional information included in the visible light.

The image receiver 11c receives a radio wave sent by a television station. The image receiver 11c demodulates the received radio wave, and extracts a baseband signal to output to the controller 12c. The baseband signal includes, similarly to the baseband signal in Embodiment 1, an image signal, an audio signal, and additional information.

The controller 12c controls the backlight 13c and the spatial light modulator 14c to have the spatial light modulator 14c display the image. The controller 12c has the spatial light modulator 14c display an image included in the radio wave received by the image receiver 11c, or an image of an operation menu screen of a cellular phone or the like. The controller 12c also modulates a carrier signal of a predetermined frequency (for example, 1 MHz) with the additional information to generate a modulated signal, and drive the backlight 13c to have a visible light output from the backlight 13c carry the additional information.

In this example, the controller 12c may have the additional information included in the baseband signal output from the image receiver 11c carried by the visible light. Alternatively, the controller 12c may generate additional information in accordance with an operational instruction from a user received by the operation section 32 and have the generated additional information carried by the visible light. The operational instruction received by the operation section 32 may be an operational command or the like for operating the image display device B.

The backlight 13c is formed of white light emitting diodes as in Embodiment 1. The backlight 13c outputs the visible light carrying the additional information to the spatial light modulator 14c under the control by the controller 12c.

The spatial light modulator 14c displays the image with an amount of light transmittance of each of the pixels being adjusted in accordance with the image signal under the control by the controller 12c as in Embodiment 1. The visible light for showing the image is received by the light receiver 42 of the image display device B. The backlight 13c and the spatial light modulator 14c form the display section 31 shown in FIG. 9.

As shown in FIG. 9, the image display device B includes a display section 41 and the light receiver 42. The light receiver 42 is disposed on a front surface of the image display device B (the same surface on which the spatial light modulator 14 is provided) around the display section 41 (for example, on the lower-left side) as shown in FIG. 9.

Figure 11:
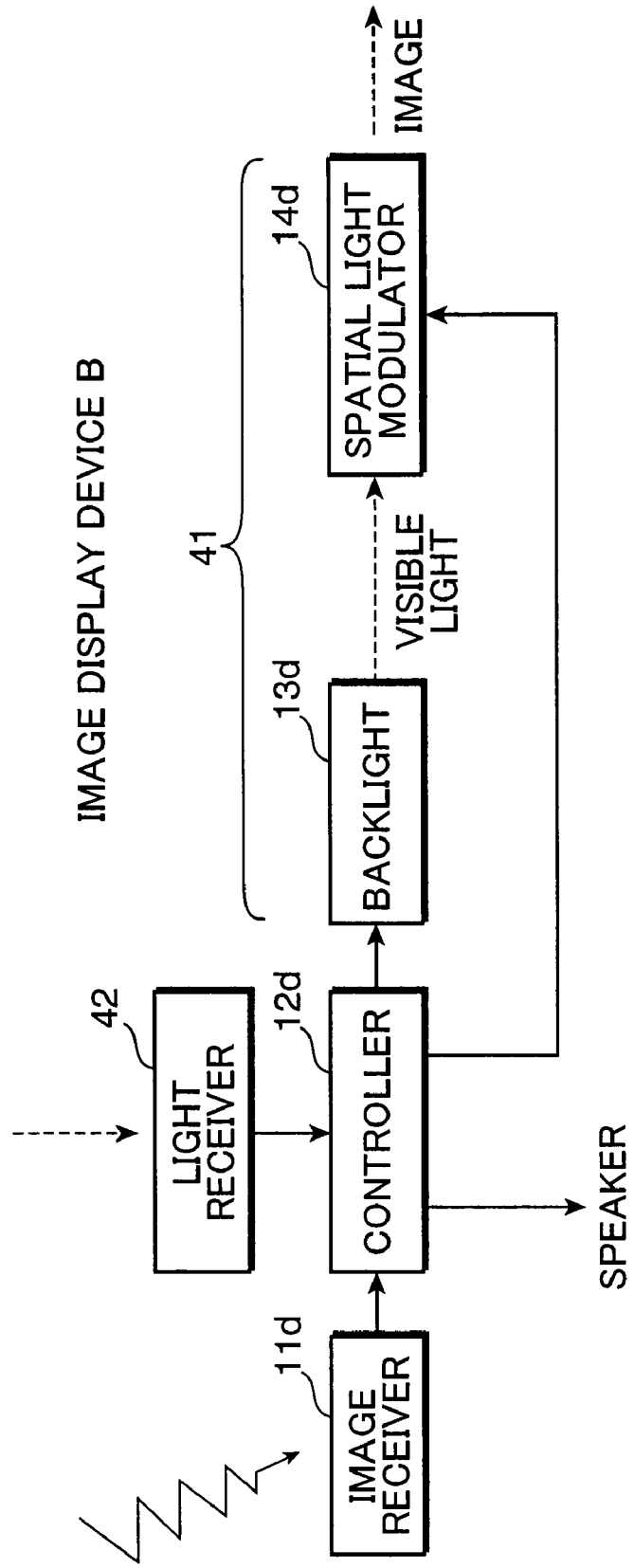
FIG. 11 is a block diagram of an image display device B shown in FIG. 9.

FIG. 11 is a block diagram of the image display device B. The image display device B includes an image receiver 11d, a controller 12d, a backlight 13d, a spatial light modulator 14d, and the light receiver 42. Similarly to the image receiver 11c, the image receiver 11d receives a radio wave sent from a television station, demodulates the signal to extract a baseband signal, and outputs to the controller 12d. The light receiver 42 receives the visible light for showing an image displayed by the image section 31 of the image display device A and extracts the additional information carried by the visible light and outputs to the controller 12d. The backlight 13d and the spatial light modulator 14d have the same structures as those of the backlight 13 and the spatial light modulator 14, and thus, will not be described further. When the additional information extracted by the light receiver 42 indicates a command, the controller 12d controls the spatial light modulator 14d so as to display the command and also controls the image display device B in various ways in accordance with the operational command indicated by the additional information.

If the operational command is an operational command for adjusting volume of the speaker, the controller 12d may adjusts the gain of the audio signal in accordance with the operational command and outputs to the speaker. If the operational command is an operational command for selecting a channel, the controller 12d may control the image receiver 11d so as to receive the channel indicated by the operational command.

As described above, according to the image display device of Embodiment 3, the light receivers 33 and 42 are respectively provided in the image display devices A and B. Thus, bidirectional data communication between the image display device A and the image display device B can be established with the display sections 31 and 41 of the image display devices A and B facing each other.

Further, according to the image display system of Embodiment 3, a television circuit may be utilized to communicate information between portable devices in a case of congestion of telephone lines when a disaster happens.

In the above example, the image display device B is a television. However, the present invention is not limited to such an example, and the image display device B may be a cellular phone similarly to the image display device A. This allows the visible light communication between portable devices to be realized. Further, additional information can be sent without providing a new communication device such as an infrared radiation communication device for sending additional information. Since the visible light is used as a carrier wave, a large amount of data can be sent easily.

Moreover, in Embodiment 3, white light emitting diodes are employed as the backlights 13c and 13d. However, the present invention is not limited to such an example, and an organic EL may be employed. Particularly, the organic EL elements allow to achieve a high-speed modulation, and the additional information can be readily sent from the display sections 31 and 41.

Embodiment 4

LED Dot Matrix Display

Figure 12:
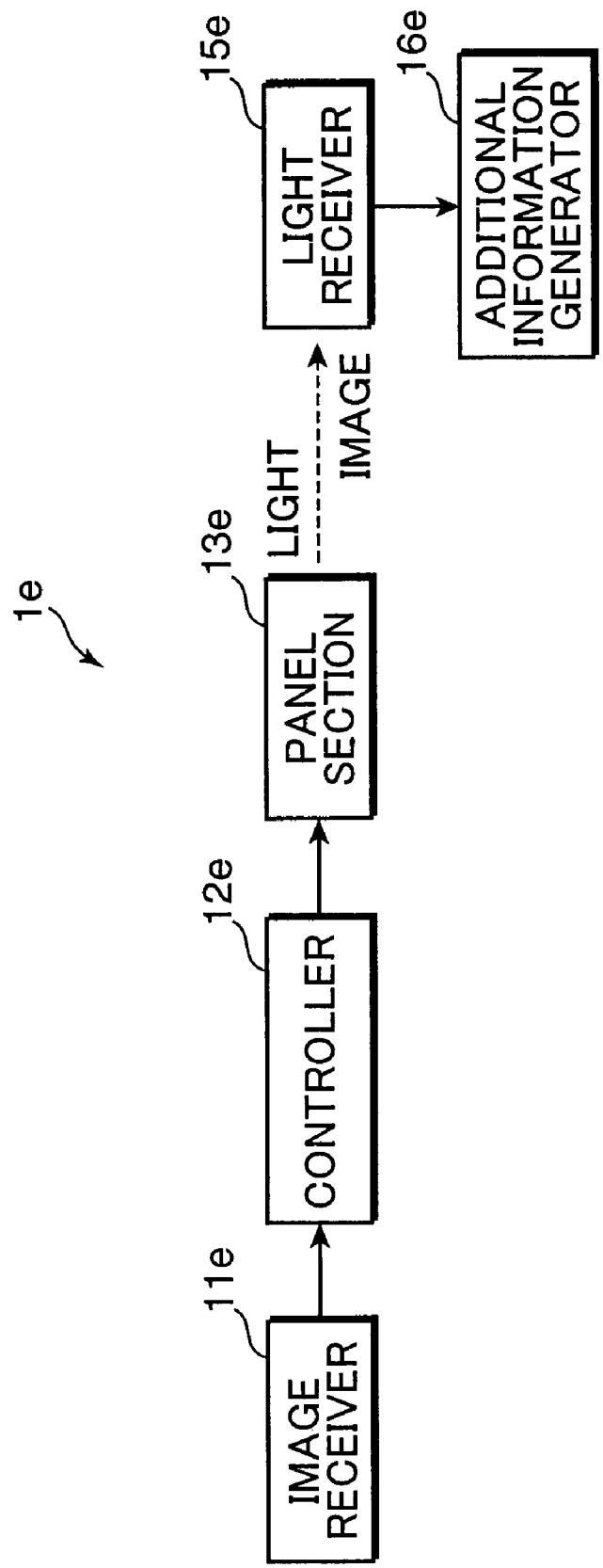
FIG. 12 is a diagram showing an entire structure of an image display system to which an image display device according to Embodiment 4 of the present invention is applied.

Next, the image display device according to Embodiment 4 will be described. A feature of the image display device of Embodiment 4 is that the image display device of the present invention is applied to an LED display. FIG. 12 is a diagram showing an entire structure of an image display system to which the image display device of Embodiment 4 is applied. The image display system includes an image display device 1e, a light receiver 15e, and an additional information generator 16e. As shown in FIG. 12, the image display device 1e includes an image receiver 11e, a controller 12e, and a panel section 13e.

The image receiver 11e demodulates a TV radio wave or the like sent from a broadcasting station, and extracts a baseband signal to output to the controller 12e. The panel section 13e is formed of light emitting diodes of red, green, and blue which are arranged in a matrix pattern. The light receiver 15e receives a visible light for showing an image to be displayed by the panel section 13e, and demodulates the received visible light to output to the additional information generator 16e. The additional information generator 16e is same as the additional information generator 16, and thus, will not be described further.

FIG. 13 is a diagram showing a detailed structure of the controller 12e shown in FIG. 12. The controller 12e includes a data extraction section 111e, an image controller 112e, and a panel controller 113e. The data extraction section 111e extracts an image signal, first additional information, and second additional information from the baseband signal output from the image receiver 11e. The data extraction section 111e outputs the image signal to the image controller 112e, and outputs the first additional information and the second additional information to the panel controller 113e. The first additional information is carried by a visible light output from one of red, green and blue light emitting diodes placed in a predetermined first display area (for example, a left half) of the panel section 13e. The second additional information is carried by a visible light output from a light emitting diode for emitting visible light of a color different from that for the first additional information, which is selected from red, green and blue light emitting diodes placed in a second display area (for example, right half) of the panel section 13e, which is different from the area in which the first additional information is displayed.

The image controller 112c generates a driving signal in accordance with the image signal extracted by the data extraction section 111e, and outputs to the light emitting diodes. The image controller 112e has the panel section 13e display the image at a frame rate of, for example, 30 Hz.

The panel controller 113e modulates the carrier signal of 1 MHz respectively with the first additional information and the second additional information to generate a first modulated signal and a second modulated signal. The panel controller 113e outputs the first modulated signal to the light emitting diodes forming the first display area, and also outputs the second modulated signal to the light emitting diodes forming the second display area. The light emitting diodes which belong to the first display area are driven by a signal obtained by combining the first modulated signal and the driving signal output from the image controller 112e. The light emitting diodes which belong to the second display area are driven by a signal obtained by combining the second modulated signal and the driving signal output from the image controller 112e.

In this way, the light emitting diodes which belong to the first display area display the image carrying the first additional information, and the light emitting diodes which belong to the second display area display the image carrying the second additional information.

As described above, according to the image display device 1e of Embodiment 4, visible light communication can be realized with an LED display as in Embodiments 1 through 3. The additional information includes the first additional information and the second additional information. The first additional information is carried by the visible light output from the light emitting diodes which form the first display area, and the second additional information is carried by the visible light output from the light emitting diodes which form the second display area. Thus, two types of additional information can be sent at the same time.

In Embodiment 4, the panel section 13e is divided into the first and the second display areas, and the visible lights carrying the first and the second information are respectively output from them. However, the present invention is not limited to such an example. The panel section 13e may be divided into three or more display areas and the visible lights carrying multiple types of additional information may be output from the respective areas. For example, the panel section 13e may be divided into four areas, and the visible lights carrying the first through fourth additional information may be output from respective areas.

Embodiment 5

Next, an image display device according to Embodiment 5 will be described. The image display device of Embodiment 5 is a three dimensional display including a lenticular lens. A feature of the image display device is that a visible light for showing an image is used for detecting a position of a viewer watching the image display device, and the lenticular lens is moved laterally in accordance with the detected result.

FIG. 14 is a block diagram showing an image display device 1f of Embodiment 5. The image display device 1f includes an image receiver 11f, a controller 12f, a backlight 13f, a spatial light modulator 14f, two light receivers 161 and 162, and a motor M. The image receiver 11f outputs a baseband signal to the controller 12f similarly to the image receiver 11 of Embodiment 1. In this example, the baseband signal is formed of the image signal and the audio signal, and does not include the additional information. The backlight 13f is same as the backlight 13 of Embodiment 1, and will not be described further.

The spatial light modulator 14f is formed of a liquid crystal panel similar to that of the spatial light modulator 14 of Embodiment 1. The liquid crystal panel is divided into six areas, i.e., two rows and three columns of display areas as shown in FIG. 15. The area of the first row, first column (an upper left area when viewed from a viewer) is determined as a first display area D1, and the area of the first row, third column (an upper right area when viewed from a viewer) is determined as a second display area D2. The lenticular lens is attached on a surface of the spatial light modulator 14 such that it can slide in a lateral direction.

Figure 16:
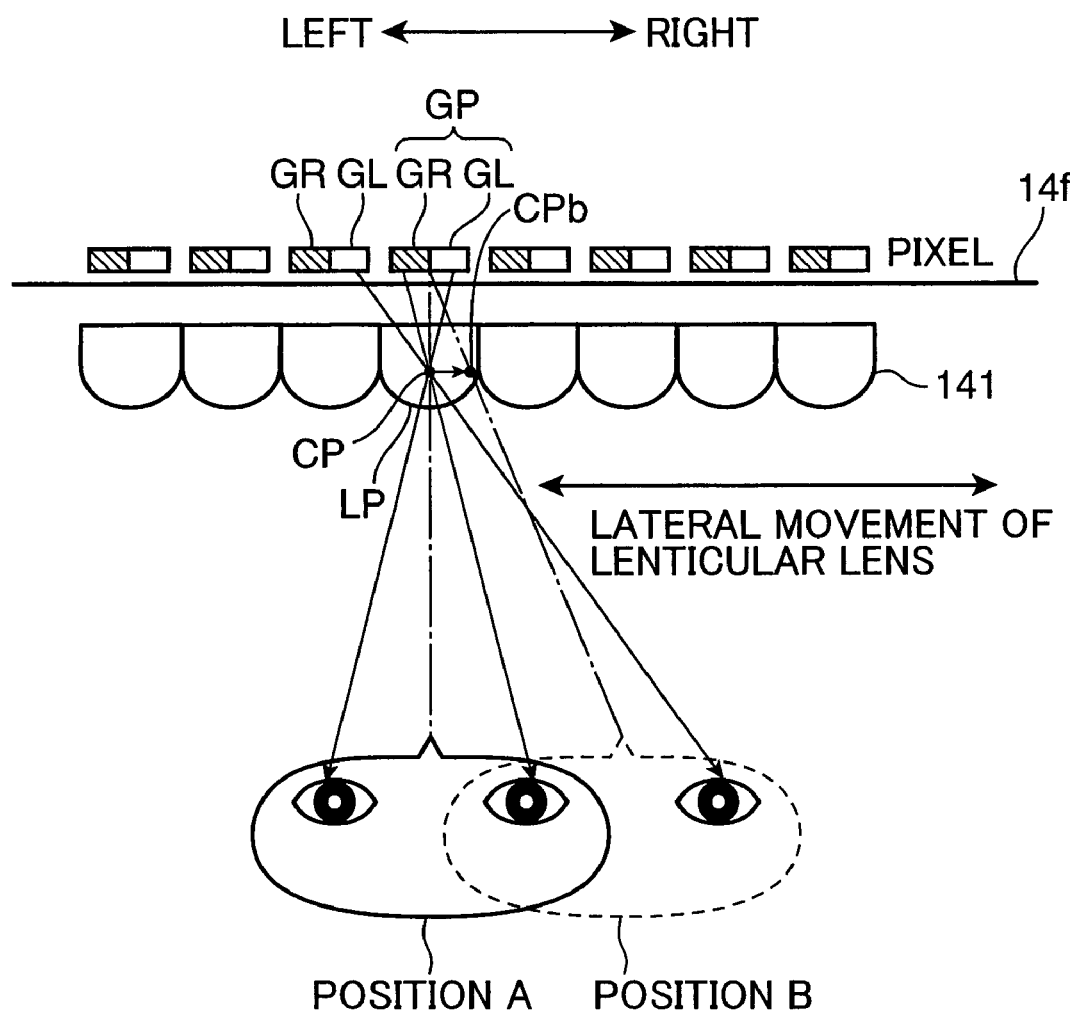
FIG. 16 is a diagram of the spatial light modulator viewed from above.

FIG. 16 is a view of the spatial light modulator 14f when viewed from above. As shown in FIG. 16, a lenticular lens 141 is attached to a surface of the spatial light modulator 14f. The lenticular lens 141 is a lens with a plurality of long and narrow lenses (lens elements) having a semicylindrical shape being arranged. The lenticular lens 141 is attached to the surface of the spatial light modulator 14f such that the semicylindrical lenses are arranged in a horizontal direction (lateral direction). The spatial light modulator 14f has pixels GL for displaying an image to be recognized by a left eye of a viewer (left image) and pixels GR for displaying an image to be recognized by a right eye of a viewer (right image) being arranged alternately. The pixels GL display the left image and the pixels GR display the right image to have the viewer recognize a three dimensional image.

The controller 12f shown in FIG. 14 separates the image signal and the audio signal from the baseband signal output from the image receiver 11f. The controller 12f controls the spatial light modulator 14f to display the image in accordance with the image signal, and has audio in accordance with the audio signal output from the speaker which is not shown. The controller 12f drives the light emitting diodes in the first display area with a sinusoidal wave having frequency f1 (an example of information for modulating the visible light with a frequency higher than the frame rate), and drives the light emitting diodes in the second display area with a sinusoidal wave having frequency f2 (an example of information for modulating the visible light with a frequency higher than the frame rate). In this example, frequency f1=10 MHz, and frequency f2=12 MHz. The frame rate of the image signal is 30 Hz, and is sufficiently lower than frequencies f1 and f2. Thus, even when the visible light modulated with frequency f1 and the visible light modulated with frequency f2 are used to have the spatial light modulator 14f display the image, the image is not affected by the modulation. Instead of the sinusoidal waves of frequencies f1 and f2, any wave which periodically changes may be employed, such as triangular waves, rectangular waves and the like of frequencies f1 and f2.

The light receiver 161 is formed of PIN photodiodes of Si, avalanche photo diodes with high sensitivity and the like, and receives the visible light modulated with frequency f1 which is reflected off the viewer. The light receiver 162 is formed of PIN photodiodes of Si, avalanche photo diodes with high sensitivity and the like, and receives the visible light modulated with frequency f2 which is reflected off the viewer. The motor M moves the lenticular lens in the lateral direction under control by the controller 12f.

Further, the controller 12f obtains a phase difference between the visible light of frequency f1 received by the light receiver 161 and the visible light of frequency f2 received by the light receiver 162. Then, the controller 12f obtains the position of the viewer based on the phase difference, and drives the motor M to move the lenticular lens 141 such that the viewer is in a stereoscopic area where the viewer can see a three dimensional image.

When a lenticular lens is used, there are a plurality of stereoscopic areas where a viewer can see a three dimensional image. When a viewer is out of the areas, the viewer sees a pseudo-stereoscopic view because an image for the right eye and the image for the left eye are opposite, and cannot see a three dimensional image. Thus, the lenticular lens is moved such that the specified position of the viewer is within the stereoscopic areas, and allows the viewer to see a three dimensional image in accordance with the position of the viewer.

Specifically, as shown in FIG. 16, when the viewer is at position A, the right image is seen by the right eye of the viewer and the left image is seen by the left eye of the viewer. Thus, a stereoscopic image can be recognized by viewer.

However, when the viewer is at position B, the left image is seen by the right eye of the viewer and the right image is seen by the left eye of the viewer. Thus, the viewer cannot recognize the stereoscopic image.

Therefore, the controller 12f drives the motor M and moves the lenticular lens 141 in the lateral direction such that center CP of a lens element LP is on a straight line connecting a center of the viewer and a center of a pixel GP, i.e., the center CP matches position CPb. Thus, the right image can be seen by the right eye of the viewer and the left image can be seen by the left eye, and a three dimensional image can be recognized.

Figure 15A:
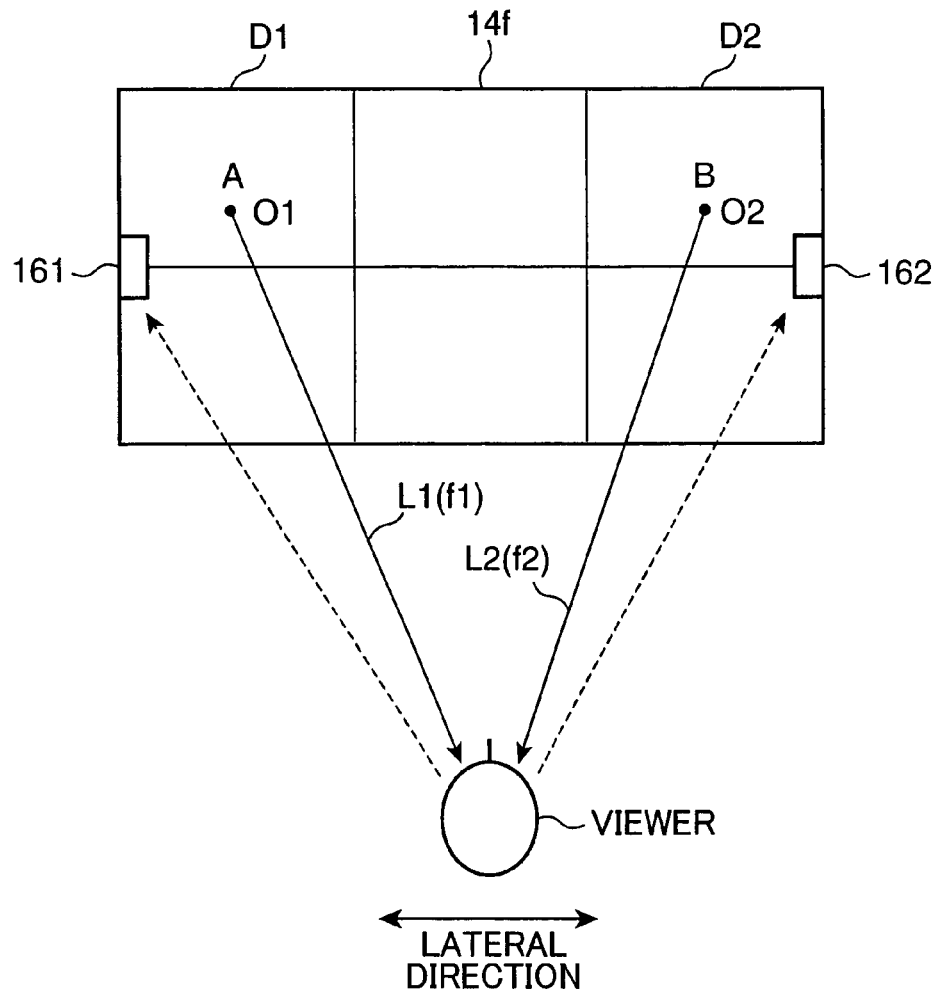
FIG. 15A is a diagram showing a relationship between a spatial light modulator and a viewer.

FIG. 15A is a diagram showing a relationship between the spatial light modulator 14f and the viewer. As shown in FIG. 15A, the light receiver 161 is attached to a central position of a left side of the spatial light modulator 14f, and the light receiver 162 is attached to a central position of a right side of the spatial light modulator 14f.

A visible light L1 which is modified with frequency f1 is output from the first display area D1. The visible light L1 is reflected off the viewer and received by the light receiver 161. A visible light L2 which is modified with frequency f2 is output from the second display area D2. The visible light L2 is reflected off the viewer and is received by the light receiver 162. The visible lights L1 and L2 are output across entirety of the first and second display areas D1 and D2. When averages are obtained, an initial point of the visible light L1 is a centroid O1 of the first display area D1 and an initial point of the visible light L2 is a centroid O2 of the second display area D2. Thus, the initial points of the visible lights L1 and L2 may be regarded as O1 and O2.

Figure 15B:
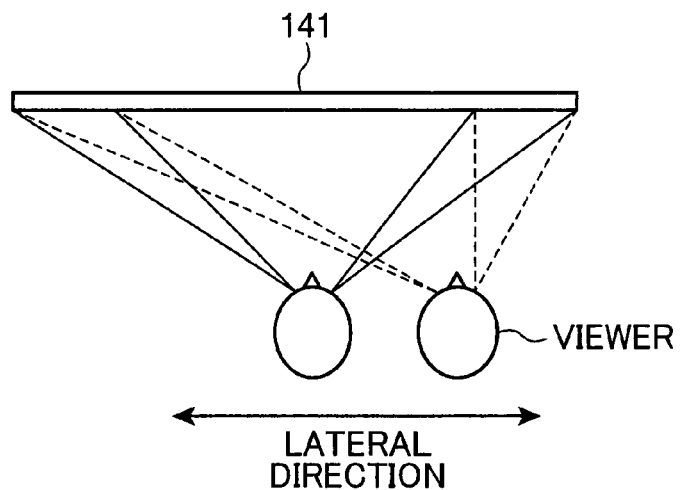
FIG. 15B is a diagram showing the relationship of the spatial light modulator with the viewer when viewed from above.

FIG. 15B is a diagram showing a relationship of the spatial light modulator 14f with the viewer when viewed from above. As shown in FIG. 15B, when the viewer moves in a lateral direction (a direction parallel to a display surface of the spatial light modulator 14f and is also parallel to a horizontal direction), a difference in optical paths of the visible light L1 and the visible light L2 changes accordingly. If the difference in the optical paths of the visible light L1 and the visible light L2 can be obtained, the position of the viewer in the lateral direction can be specified. The difference in the optical paths can be uniquely specified from a phage difference between the visible light L1 and the visible light L2. Thus, if the phase difference between the visible light L1 and the visible light L2 are obtained, the position of the viewer in the lateral direction can be specified.

Therefore, the controller 12f calculates the phase difference between the visible light L1 received by the light receiver 161 and the visible light L2 received by the light receiver 162. Based on the phase difference, the controller 12f calculates the position of the viewer in the lateral direction, and moves the lenticular lens 141 in the lateral direction such that the viewer is in a stereoscopic area. Thus, the viewer can see a three dimensional image without moving.

As described above, according to the image display device of Embodiment 5, the visible light L1 output from the first display area D1 is modulated with the frequency f1, and the visible light L2 output from the second display area D2 is modulated with the frequency f2. The visible lights reflected off the viewer are respectively received by the light receivers 161 and 162 to obtain the phase difference between the visible lights. The position of the user in the lateral direction is obtained based on the phase difference, and the lenticular lens 141 is moved such that the viewer is in the stereoscopic area. Thus, the viewer can see the three dimensional image in a preferable state from any position along the lateral direction.

In embodiment 5, the position of the viewer is specified. However, the present invention is not limited to such an example, and presence/absence of the viewer may be specified. In such a case, the backlight 13f may output only one of the visible lights L1 and L2. The controller 12f specifies presence/absence of the viewer based on intensity of the visible light received by one of the light receivers 161 and 162. When there is no viewer, controlling operation such as turning off the power of the image display device 1f or muting the audio may be performed. Alternatively, the controller 12f may detect whether the viewer is moving or not based on a change in the intensity of the received visible light.

Embodiment 6

Position Detection at Light Receiving Elements

Figure 17:
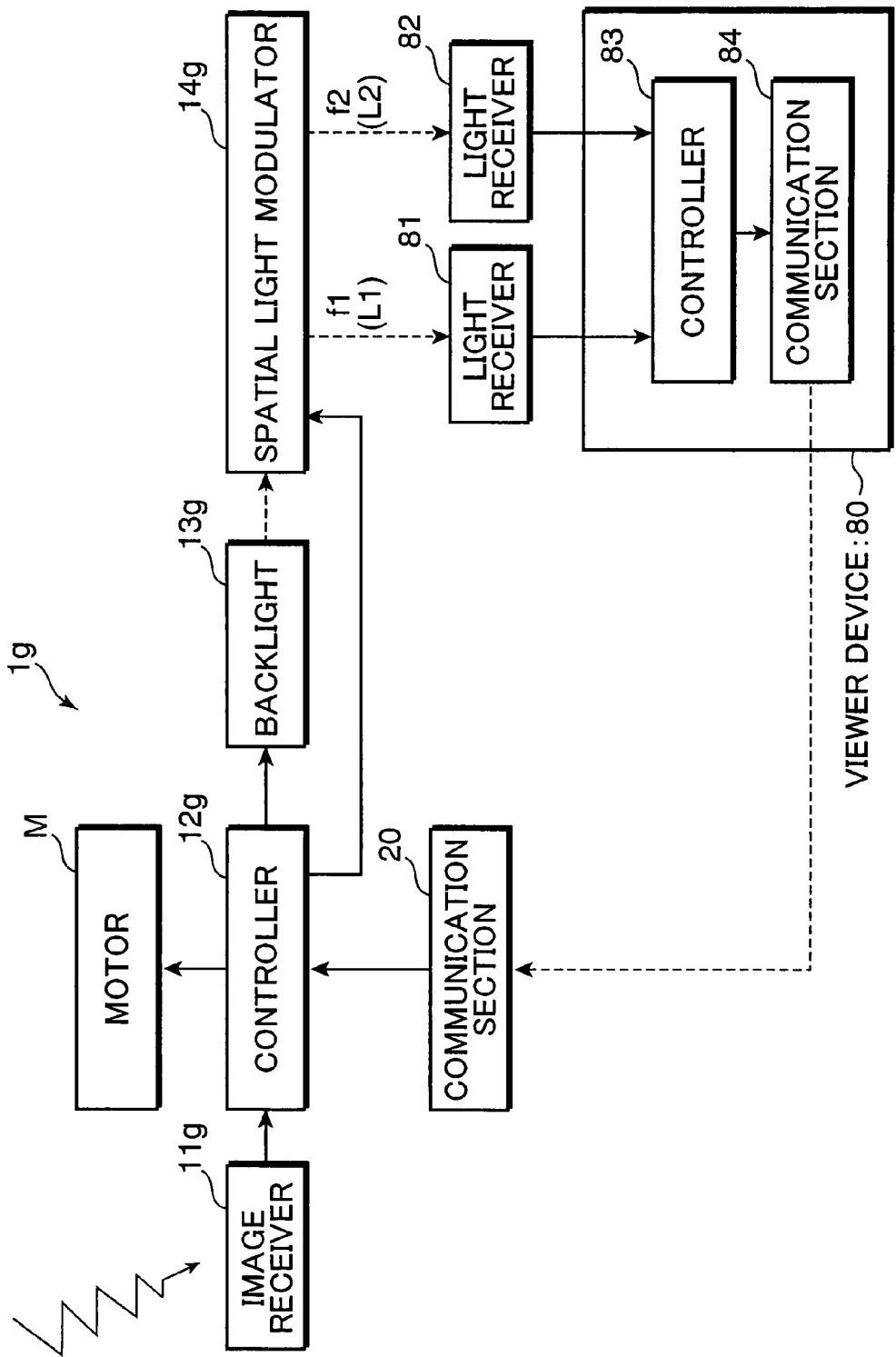
FIG. 17 is a diagram showing an entire structure of an image display system to which an image display device according to Embodiment 6 of the present invention is applied.

Next, an image display device according to Embodiment 6 will be described. FIG. 17 is a diagram showing an entire structure when the image display device of Embodiment 6 is applied to an image display system. The image display system shown in FIG. 17 includes an image display device 1g and a viewer device 80. The viewer device 80 is formed of a cellular phone, remote controller of a television and the like, and includes a light receiver 81, a light receiver 82, a controller, and a communication section 84.

The light receivers 81 and 82 are formed of PIN photo diodes of Si, avalanche photo diodes with high sensitivity, or the like, and are attached to glasses, sunglasses or the like worn by the user. The light receiver 81 receives a visible light L1 modulated with frequency f1 which is output from the image display device 1f. The light receiver 82 receives a visible light L2 modulated with frequency f2 which is output from the image display device 1f.

The controller 83 calculates a phase difference between the visible lights L1 and L2 received by the light receivers 81 and 82 similarly to the controller 12f in Embodiment 5. Based on the calculated phase difference, the controller 83 specifies the position of the viewer in the lateral direction. The communication section 84 sends a signal indicating the position of the viewer specified by the controller 12f to the image display device 1g. The communication section 84 may be, for example, a communication device by radio such as wireless LAN, Bluetooth, or the like, a wired communication device such as USB, Ethernet (registered trademark), and the like.

The image display device 1g includes an image receiver 11g, a controller 12g, a backlight 13g, a spatial light modulator 14g, a motor M, and a communication section 20. The image receiver 11g through the backlight 13g, the spatial light modulator 14g, and the motor M are same as the counterparts in the image display device of Embodiment 5, and will not be described further. The communication section 20 receives a signal indicating a position of the viewer which is sent from the communication section 84 of the viewer device 80, and outputs to the controller 12g. Similarly to the communication section 84, the communication section 20 may be a communication device by radio such as wireless LAN, Bluetooth, or the like, or a wired communication device using LAN cable such as 100BASE-TX and the like.

The controller 12g specifies the position of the viewer based on the signal received by the communication section 20. The controller 12g drives the motor M to move the lenticular lens 141 in the lateral direction such that the viewer is in the stereoscopic area using a method similar to that in Embodiment 5.

Figure 18:
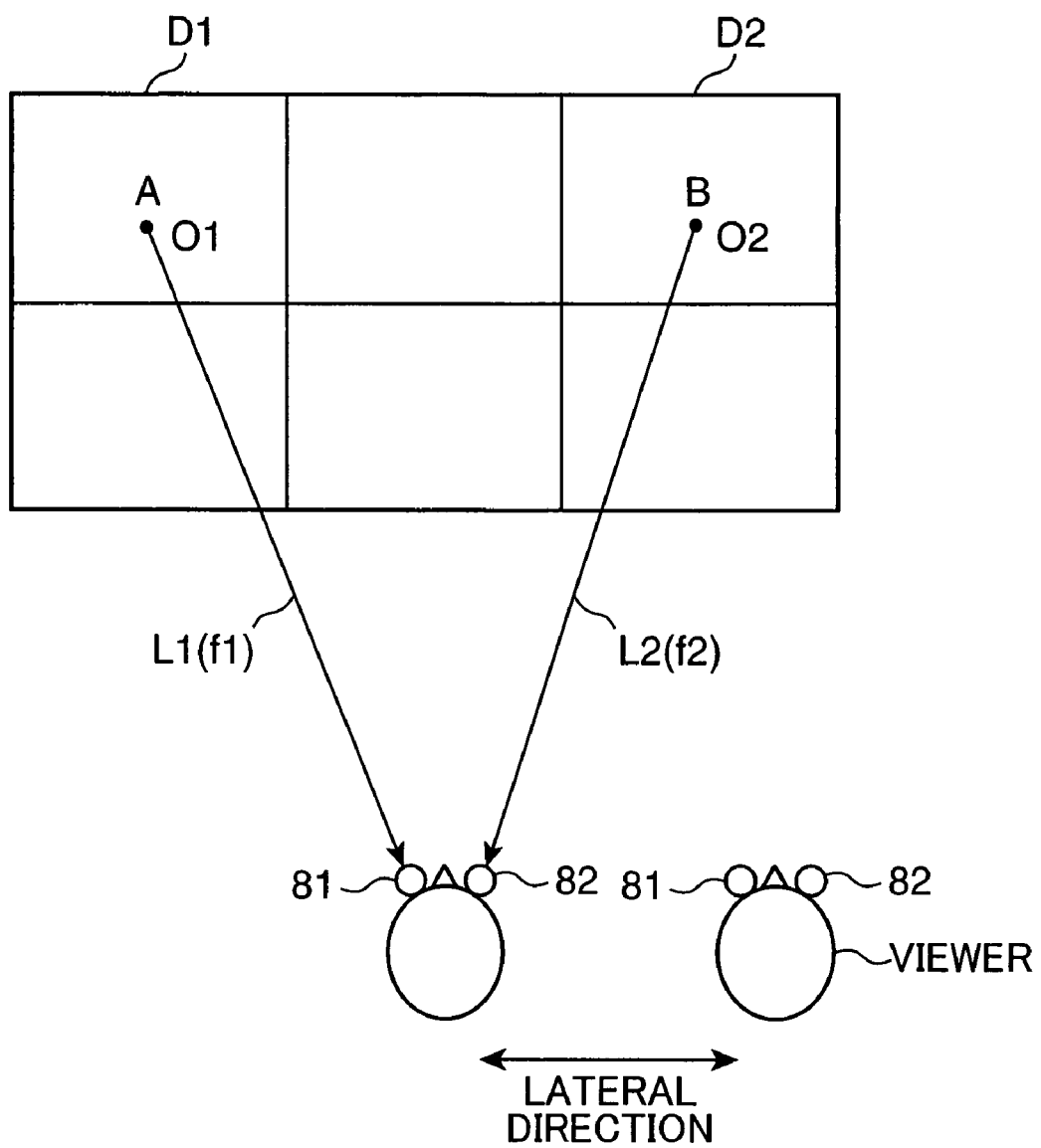
FIG. 18 is a diagram showing a relationship between an image display device according to Embodiment 6 and a viewer.

FIG. 18 is a diagram showing a relationship between the image display device 1g and the viewer according to Embodiment 6. The visible light L1 output from the first display area D1 is received by the light receiver 81. The visible light L2 output from the second display area D2 is received by the light receiver 82. As shown in FIG. 18, when the viewer moves in the lateral direction, optical paths of the visible light L1 and the visible light L2 change accordingly. Thus, if the phase difference between the visible light L1 and the visible light L2 is obtained, the position of the viewer in the lateral direction can be specified. Thus, the controller 83 specifies the position of the viewer in the lateral direction based on the optical path difference between the visible light L1 and the visible light L2.

As described above, according to the image display device of Embodiment 6, the light receivers 81 and 82 are provided in the viewer device 80 to receive the visible light L1 and the visible light L2. The position of the viewer is specified, and the signal indicating the specified position is sent to the image display device 1g. The image display device 1g which has received the signal moves the lenticular lens 141 such that the lenticular lens 141 moves toward the viewer. Thus, the viewer can see a three dimensional image in a preferable state at any position along the lateral direction.

Embodiment 7

Position Detection by a Laser Display

Figure 19:
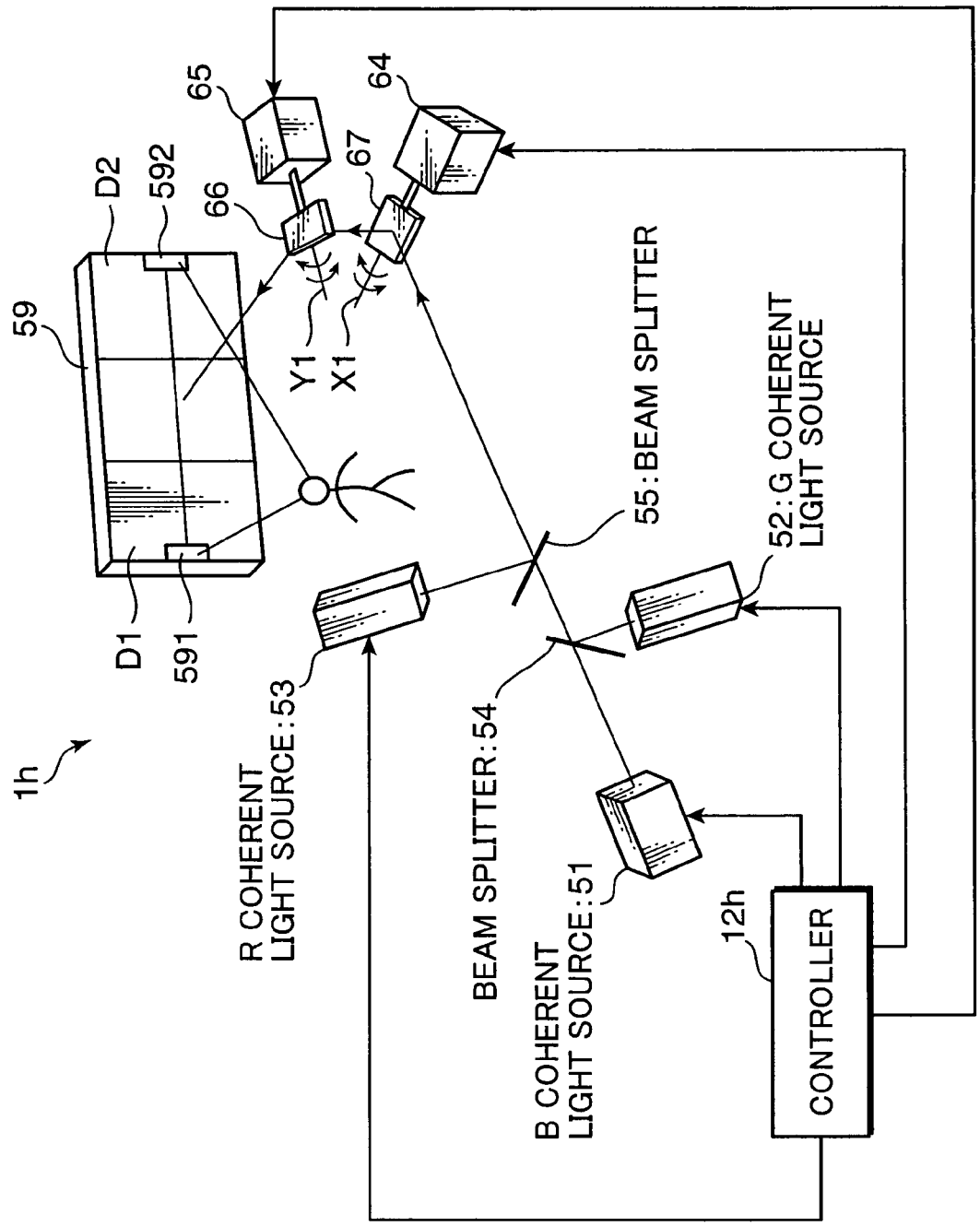
FIG. 19 is a diagram showing an image display device according to Embodiment 7.

Next, Embodiment 7 in which a position of a viewer is detected using a laser display will be described. FIG. 19 is a diagram showing an image display device of Embodiment 7. An image display device 1h includes similar components as the image display device 1b of Embodiment 2 shown in FIG. 6, but further includes motors 64 and 65, and scanning mirrors 66 and 67 instead of the lenses 56 and 57. The scanning mirror 67 is a mirror for reflecting a laser beam output from the beam splitter 55, and scanning in a horizontal direction (X direction) of the screen. The scanning mirror 66 is a mirror for reflecting the laser bean reflected by the scanning mirror 67 and scanning in a vertical direction (Y direction) of the screen. In Embodiment 7, the scanning mirrors 66 and 67 are examples of spatial light modulators.

The motor 64 rotates the scanning mirror 67 with a rotational axis X1 being an axis such that the laser beam is scanned in X direction under the control by the controller 12h. The motor 65 rotates the scanning mirror 66 with a rotational axis Y1 being an axis such that the laser beam is scanned in Y direction under the control by the controller 12h.

The screen 59 is separated into six display areas, for example, two rows and three columns of display areas. The display area on the first row, first column is a first display area D1. The display area of the first row, third column is a second display area D2. On the left side and the right side of the screen 59, light receivers 591 and 592 for receiving the light reflected off the viewer are respectively provided around their centers.

The controller 12h controls the B through R coherent light sources 51 through 53 and the motors 64 and 65 in accordance with the image signal, and has the screen 59 display the image. The controller 12h drives the B through R coherent light sources 51 through 53 with a signal of frequency f1 (which is higher than the frame rate of the image signal) while the laser beam is scanning in the first display area D1, and has the laser beam carry the wave of the frequency f1. Further, the controller 12h drives the B through R coherent light sources 51 through 53 with a signal of frequency f2 (which is higher than the frequency f1 and is different from the frequency f1) while the laser beam is scanning in the second display area D2, and has the laser beam carry the wave of the frequency f2.

Moreover, the controller 12h uses a method same as that in Embodiment 5 to specify the position of the viewer based on the visible lights from the user which are received by the light receivers 591 and 592.

As described above, according to the image display device of Embodiment 7, the position of the viewer can be specified also in the image display device formed of a laser display.

The present invention may employ the following modifications.

(A) In Embodiment 4, the visible light carrying the first additional information is output from the first display area, and the visible light carrying the second additional information which has a different wavelength is output from the second display area. However, the present invention is not limited to such an example, but a visible light carrying a periodic wave of frequency f1 may be output from the first display area, and a visible light carrying a periodic wave of frequency f2 may be output from the second display area to detect the position, presence/absence, and movement of the viewer as in Embodiments 5 and 6.

(B) In Embodiments 5 and 6, the visible light carrying the wave of the frequency f1 is output from the first display area D1, and the visible light carrying the wave of the frequency f2 is output from the second display area D2. However, the present invention is not limited to such an example, but a sinusoidal wave of the frequency f1 may be carried by a visible light output from a light emitting diode of a predetermined first color (wavelength) which is selected from the light emitting diodes forming the backlight for outputting a visible light to the first display area D1, and a visible light output from the light emitting diode having a second color (wavelength) different from the first color (wavelength) which is selected from the light emitting diodes forming a backlight outputting the visible light to the second display area D2. The light receiver 161 or 81 may be formed of a light receiver for receiving the first color, and the light receiver 162 or 82 may be formed of a light receiver for receiving the second color to detect the position of the viewer.

(C) As in Embodiments 5 and 6, a lenticular lens may be provided on the screen 59 so as to be movable in a lateral direction, and the lenticular lens may be moved such that a viewer can see a three dimensional image.

(D) In above Embodiments 5 through 7, acoustical equipment such as a surround system including a plurality of speakers may be provided. A controller may be placed at a specified viewer's position to allow the viewer to control a sound volume and phase of the plurality of speakers so that the viewer can listen preferable sound. In this way, the viewer can listen to preferable sound at any place without moving.

(E) In Embodiment 7, two scanning mirrors 66 and 67 are used to detect the image. However, the present invention is not limited to such an example. The position of the viewer can also be detected in a laser display which scans a laser beam in one dimension using one scanning mirror. In such a case, the controller 12h may control the B through R coherent light sources 51 through 53 such that the wave of the frequency f1 is carried by the laser beam when the laser beam is scanning the first display area D1, and the wave of the frequency f2 is carried by the laser beam when the laser beam is scanning the second display area D2.

(F) In Embodiment 7, the controller 12h may detect the position of the viewer by having the wave of the frequency f1 carried by a laser beam of only one color from the B through R coherent light sources 51 through 53 when the laser beam scans the first display area D1, and having the wave of the frequency f1 carried by only one laser beam having a color different from the above one color when the laser beam scans the second display area D2.

(G) In Embodiment 7, the controller 12h may have the laser beam carry the wave of the frequency f1, and may receive this laser beam reflected off the viewer to detect the presence or absence of the viewer based on the intensity of the received reflected light. When there is no viewer, controlling operations such as muting or entering into a power saving mode may be performed.

SUMMARY OF THE INVENTION (1) An image display device of the present invention, comprises: a display section which includes a light source and displays an image based on a visible light output from the light source; and a controller for having the display section display the image at a predetermined frame rate, modulating an intensity of the visible light with a frequency higher than the frame rate, and having the visible light carry predetermined information.

With such a structure, the intensity of the visible light output from the light source, which forms the display section, is modulated with the frequency higher than the frame rate of the image to be displayed on the display section. Thus, the visible light of an image to be displayed can carry the predetermined information without interfering with the image, and the visible light communication can be realized. Further, since the visible light for displaying the image is used as a carrier, no separate light source or the like is required for sending predetermined information. Thus, the cost reduction and simplification of the device can be achieved.

(2) Further, the controller preferably modulates the intensity of the visible light with a frequency of 1 kHz or higher.

With this structure, the intensity of the visible light is modulated with a frequency of 1 kHz or higher. The frequency is significantly higher than 30 Hz, the frame rate of the image of a television, and the like. Thus, the visible light communication can be realized without adversely influencing the image.

(3) In the above structure, the predetermined information is preferably additional information added to the image signal.

With this structure, additional information such as program information, text information, and the like added to the image signal is carried by the visible light. Thus, a separate communication means is not necessary for taking out the additional information from the image display device.

Further, in the above structure, it is preferable that: the predetermined information includes multiple types of information for modulating the intensity of the visible light with multiple types of frequencies higher than the frame rate; and the display section includes a plurality of display areas, the device further comprising light receivers for receiving visible lights output from the display areas of the display section which are reflected off an object, wherein, the controller controls the light source such that visible lights having the intensity modulated using the multiple types of information are output from different display areas, and specifies a position of the object based on a phase difference among reflected light received by the light receivers.

With this structure, visible lights having the intensity modulated with different frequencies are output from a plurality of display areas forming the display section, the visible lights reflected off an object are received, and the position of the viewer is specified based on a phase difference of the received reflected light.

Herein, depending upon the position of the viewer in a lateral direction with respect to the display section, a difference between an optical path of a visible light output from a certain display area until it is reflected off the viewer and reaches back to the light receiver and an optical path of a visible light output from another display area until it is reflected off the viewer and reaches back to the light receiver varies. The difference between the optical paths of the visible lights can be determined uniquely by the phase difference between the visible lights. Thus, the controller can uniquely identify where the viewer is by obtaining the phase difference between the visible lights.

(5) Further, in the above structure, it is preferable that: the light sources output multiple types of visible lights each having different wave lengths; the predetermined information includes information for modulating the intensity of the visible light at a frequency higher than the frame rate; and the display section includes a plurality of display areas, the device further comprising light receivers for receiving visible lights output from the display areas which are reflected off an object, wherein, the controller controls the light source such that a type of the visible light having the intensity being modified varies for each of the display areas, and specifies a position of the object based on a phase difference among reflected light received by the light receivers.

With this structure, visible lights having a wavelength different from those from other display areas and having an intensity modulated with a frequency higher than the frame rate is output from each of the display areas. Thus, a difference between an optical path of a visible light output from a certain display area until it is reflected off the viewer and reaches back to the light receiver and an optical path of a visible light output from another display area until it is reflected off the viewer and reaches back to the light receiver varies. The difference between the optical paths of the visible lights can be determined uniquely by the phase difference between the visible lights. Thus, the controller can uniquely identify where the viewer is by obtaining the phase difference between the visible lights.

(6) Further, in the above structure, it is preferable that: the object is a viewer; the display section displays a three dimensional image; and the controller controls the display section such that the viewer can recognize the three dimensional image at the specified position of the viewer.

With this structure, the viewer can watch a three dimensional image in a preferable state at any place without moving.

(7) Further, in the above structure, it is preferable that: a speaker is further included; the object is a viewer; and the controller adjusts a sound volume and a phase of the speaker based on the specified position of the viewer.

With this structure, the viewer can listen to sounds in a preferable state at any place without moving.

(8) Further, in the above structure, it is preferable that: a light receiver for receiving light reflected off a viewer is further included; the predetermined information includes information for modifying the intensity of the visible light at a frequency higher than the frame rate; and the controller detects at least one of presence/absence and movement of the viewer based on an intensity of the reflected light received by the light receiver.

With this structure, the visible light for showing the image is used for detecting presence/absence of the viewer. Thus, if there is no viewer, a controlling operation such as turning off the power of the image display device, entering into the power saving mode, or the like may be performed.

(9) It is preferable that: an image receiver for receiving an image signal is further included; the display section includes a backlight as the light source, and a spatial light modulator for spatial modulating a visible light from the backlight to display an image; and the controller has the spatial light modulator spatially modulate in accordance with the image signal, and also modulates the intensity of the visible light output from the backlight to have the visible light carry the predetermined information.

With this structure, visible light communication can be realized in an image display device including a backlight, and a spatial light modulator for spatial modulating a visible light from the backlight to display an image such as a liquid crystal television.

(10) It is preferable that: the predetermined information is additional information added to the image signal; and the controller modulates a carrier signal having a frequency higher than the frame rate with the additional information, and drives the backlight with the modulated carrier signal.

With this structure, a carrier signal having a frequency higher than the frame rate of the image is modulated with the additional information such as program information, text information and the like added to the image signal, and the backlight is driven by the modulated signal. Thus, more precise visible light communication can be realized without adversely influencing the image.

(11) It is preferable that: the predetermined information includes multiple types of information for modulating the intensity of the visible light with multiple types of frequencies higher than the frame rate; and the spatial light modulator includes a plurality of display areas, the device further comprising light receivers for receiving visible lights output from the display areas of the spatial light modulator which are reflected off an object, wherein, the controller controls the backlight such that visible lights having the intensity modified using the multiple types of information are respectively output from different display areas and specifies a position of the object based on a phase difference among the reflected light received by the light receivers.

With this structure, the position of the viewer can be specified in an image display device including a backlight such as a liquid crystal television as described in the above section (4).

(12) It is preferable that: the backlight outputs multiple types of visible lights having different wavelengths; the predetermined information includes information for modulating the intensity of the visible lights with multiple types of frequencies higher than the frame rate; and the spatial light modulator includes a plurality of display areas, the device further comprising light receivers for receiving visible lights output from the display areas which are reflected off an object, wherein, the controller controls the backlight such that a type of visible light varies for each of the display areas and specifies a position of the object based on a phase difference among the reflected light received by the light receivers.

With this structure, the position of the viewer can be specified in an image display device including a backlight such as a liquid crystal television as described in the above section (5).

(13) It is preferable that: the object is a viewer; the spatial light modulator is provided with a lenticular lens which is formed of convex lens bodies with the lens bodies being arranged in a lateral direction, and is attached on a surface of the spatial light modulator so as to be movable in a lateral direction; and the controller moves the lenticular lens such that the specified position of the viewer is within a stereoscopic area.

With this structure, the viewer can watch a three dimensional image in a preferable state at any place without moving.

(14) It is preferable that: a speaker is further included; the object is a viewer; and the controller adjusts a sound volume and a phase of the speaker based on the specified position of the viewer. With this structure, the viewer can listen to sounds in a preferable state at any place without moving.

(15) It is preferable that: a light receiver for receiving light reflected off a viewer is further included; the predetermined information includes information for modifying the visible light at a frequency higher than the frame rate; and the controller detects at least one of presence/absence and movement of the viewer based on an intensity of the reflected light received by the light receiver.

With this structure, the visible light for showing the image is used for detecting presence/absence of the viewer. Thus, if there is no viewer, a controlling operation such as turning off the power of the image display device, entering into the power saving mode, or the like may be performed.

(16). The backlight is preferably formed of light emitting diodes.

With this structure, the backlight is formed of light emitting diodes which allows a high-speed modulation and has directivity. Thus, the predetermined information can be carried by the visible light with a high precision.

(17) The light emitting diodes are preferably formed of red, green and blue light emitting diodes.

With this structure, a color image can be displayed.

(18) It is preferable that: an image receiver for receiving an image signal is further included; the display section includes a coherent light source as the light source, a spatial light modulator for spatial modulating coherent light output from the coherent light source, and a screen for projecting the coherent light which is spatially modulated by the spatial light modulator; and the controller has the spatial light modulator spatially modulate in accordance with the image signal, and also modulates the intensity of the coherent light to have the coherent light carry the predetermined information.

With this structure, visible light communication can be realized in an image display device including a coherent light source, a spatial light modulator, and a screen such as a laser display.

(19) Further, in the above structure, it is preferable that: the predetermined information is additional information added to the image signal; and the controller modulates a carrier signal having a frequency higher than the frame rate with the additional information, and drives the coherent light source with the modulated carrier signal.

With this structure, the carrier signal having a frequency higher than the frame rate of the image is modulated with additional information such as program information, text information, or the like added to the image signal and the coherent light source is driven by the modulated carrier signal. Thus, visible light communication with higher precision can be realized without adversely influencing the image.

(20) Further, in the above structure, it is preferable that: light receivers for receiving visible lights output from the display areas of the screen which are reflected off an object are further included; and the controller controls the coherent light source such that visible lights having the intensity modified using the multiple types of information are respectively output from different display areas and specifies a position of the object based on a phase difference among the reflected light received by the light receivers.

With this structure, the position of the viewer can be specified in an image display device such as laser display as described in the above section (4).

(21) Further, in the above structure, it is preferable that: the coherent light source includes a plurality of coherent light sources for outputting multiple types of visible lights having different wavelengths; the predetermined information includes information for modulating the intensity of the visible lights with multiple types of frequencies higher than the frame rate; and the screen includes a plurality of display areas, the device further comprising light receivers for receiving visible lights output from the display areas which are reflected off an object, wherein, the controller controls the coherent light source such that a type of visible light varies for each of the display areas and specifies a position of the object based on a phase difference among the reflected light received by the light receivers.

With this structure, the position of the viewer can be specified in an image display device such as laser display as described in the above section (5).

(22) Further, in the above structure, it is preferable that: the object is a viewer; the screen is provided with a lenticular lens which is formed of convex lens bodies with the lens bodies being arranged in a lateral direction, and is attached on a surface of the screen so as to be movable in a lateral direction; and the controller moves the lenticular lens such that the specified position of the viewer is within a stereoscopic area.

With this structure, the viewer can watch a three dimensional image in a preferable state at any place without moving.

(23) Further, in the above structure, it is preferable that: a speaker is further included; the object is a viewer; and the controller adjusts a sound volume and a phase of the speaker based on the specified position of the viewer. With this structure, the viewer can listen to sounds in a preferable state at any place without moving.

(24) Further, in the above structure, it is preferable that: a light receiver for receiving light reflected off a viewer is further included; the predetermined information includes information for modifying the visible light at a frequency higher than the frame rate; and the controller detects at least one of presence/absence and movement of the viewer based on an intensity of the reflected light received by the light receiver.

With this structure, the visible light for showing the image is used for detecting presence/absence of the viewer. Thus, if there is no viewer, a controlling operation such as turning off the power of the image display device, entering into the power saving mode, or the like may be performed.

(25) Further, in the above structure, it is preferable that: the coherent light source is a semiconductor laser or a wavelength conversion laser; and the controller modulates a carrier signal having a frequency higher than the frame rate with the additional information, and drives the semiconductor laser or the wavelength conversion laser with the modulated carrier signal.

With this structure, a carrier signal having a frequency higher than the frame rate of the image is modulated with additional information such as program information, text information or the like, and a semiconductor laser or a waveconversion type laser is driven by the modulated carrier signal. Thus, the additional information can be carried by the visible light precisely.

(26) The coherent light source is preferably formed of red, green and blue light coherent light sources. With this structure, a color image can be displayed.

(27). It is preferable that: an image receiver for receiving an image signal is further included; the display section is formed of luminous bodies corresponding to pixels which are arranged in a matrix pattern; and the controller drives the light source in accordance with the image signal to have the display section display an image, and modifies an intensity of a visible light output from the light source to have the visible light carry the predetermined information.

With this structure, visible light communication by the video image display device such as LED dot matrix display can be realized.

(28) Further, in the above structure, it is preferable that the predetermined information is additional information added to the image signal; and the controller modulates a carrier signal having a frequency higher than the frame rate with the additional information, and drives the light source with the modulated carrier signal.

With this structure, a carrier signal having a frequency higher than the frame rate of the image is modulated with additional information such as program information, text information or the like, and the light source is driven by the modulated carrier signal. Thus, the additional information can be carried by the visible light precisely.

(29) Further, in the above structure, it is preferable that: the predetermined information includes multiple types of information for modulating the intensity of the visible light with multiple types of frequencies higher than the frame rate; and the display section includes a plurality of display areas, the device further comprising light receivers for receiving visible lights output from the display areas of the screen which are reflected off an object, wherein, the controller controls the luminous bodies such that visible lights having the intensity modified using the multiple types of information are respectively output from different display areas and specifies a position of the object based on a phase difference among the reflected light received by the light receivers.

With this structure, the position of the viewer can be specified in an image display device such as an LED dot matrix display and the like as described in the above section (4).

(30) Further, in the above structure, it is preferable that: the luminous bodies include a plurality of luminous bodies for outputting multiple types of visible lights having different wavelengths; the predetermined information includes information for modulating the intensity of the visible light with a frequency higher than the frame rate; and the display section includes a plurality of display areas, the device further comprising light receivers for receiving visible lights output from the display areas which are reflected off an object, wherein, the controller controls the luminous bodies such that a type of visible light varies for each of the display areas and specifies a position of the object based on a phase difference among the reflected light received by the light receivers.

With this structure, the position of the viewer can be specified in an image display device such as an LED dot matrix display and the like as described in the above section (5).

(31) Further, in the above structure, it is preferable that: the object is a viewer; the display section is provided with a lenticular lens which is formed of convex lens bodies with the lens bodies being arranged in a lateral direction, and is attached on a surface of the display section so as to be movable in a lateral direction; and the controller moves the lenticular lens such that the specified position of the viewer is within a stereoscopic area.

With this structure, the viewer can watch a three dimensional image in a preferable state at any place without moving.

(32) Further, in the above structure, it is preferable that a speaker is further included; the object is a viewer; and the controller adjusts a sound volume and a phase of the speaker based on the specified position of the viewer.

With this structure, the viewer can listen to sounds in a preferable state at any place without moving.

(33) Further, in the above structure, it is preferable that: a light receiver for receiving light reflected off a viewer is further included; the predetermined information includes information for modifying the intensity of the visible light with a frequency higher than the frame rate; and the controller detects at least one of presence/absence and movement of the viewer based on an intensity of the reflected light received by the light receiver.

With this structure, the visible light for showing the image is used for detecting presence/absence of the viewer. Thus, if there is no viewer, a controlling operation such as turning off the power of the image display device, entering into the power saving mode, or the like may be performed.

(34) It is preferable that: the controller drives the luminous bodies with a signal obtained by combining a driving signal for the light source in accordance with the image signal and a modulated signal obtained by modulating a carrier signal having a frequency higher than the frame rate.

With this structure, the predetermined information can be carried by the visible light with a high precision without adversely influencing the image signal.

(35) The light source is preferably a light emitting diode or an organic EL.

With this structure, the predetermined information can be carried by the visible light with a high precision.

(36) The luminous bodies are preferably red, green and blue luminous bodies. With this structure, a color image can be displayed.

(37) An image display system according to the present invention is an image display system formed of a plurality of image display devices, wherein: each image display device includes a display section which includes a light source and displays an image based on a visible light output from the light source, a controller for having the display section display the image at a predetermined frame rate, modulating an intensity of the visible light with a frequency higher than the frame rate, and having the visible light carry additional information added to the image signal, and a light receiver for receiving a visible light for showing an image displayed on the display section and extracting additional information from the received visible light; and communication using visible lights is established among the plurality of image display devices.

With this structure, visible light communication can be established among the image display devices.

(38) It is preferable that at least one of the plurality of image display devices is included in a portable device.

With this structure, visible light communication can be established between a portable device and an image display device, or between portable devices.

(39) It is preferable that: a lower limit of an intensity of the visible light for showing the image displayed on the display section is set such that the intensity of the visible light is larger than a lower limit for detection by the light receiver.

With this structure, visible light communication can be established in a black scene.

(40) An image display system of the present invention is an image display system, comprising: an image display device which includes a display section which includes a light source and displays an image based on a visible light output from the light source, and a controller for having the display section display the image at a predetermined frame rate, modulating an intensity of the visible light with a frequency higher than the frame rate, and having the visible light carry additional information added to the image signal; a light receiver for receiving a visible light for showing an image displayed on the display section and extracting additional information from the received visible light; and an additional information generator for outputting additional information extracted by the light receiver.

With this structure, effects similar as those described in above section (1) can be achieved.

(41) An image display system of the present invention is an image display system formed of an image display device and a viewer device, wherein: the image display device includes a display section which includes a light source and displays an image based on a visible light output from the light source, and a controller for modifying an intensity of the visible light from the light source using multiple types of information for modulating an intensity with multiple types of frequencies higher than the frame rate of the image and controlling the light source such that visible lights having the intensity modified using the multiple types of information are respectively output from different display areas; and the viewer device includes a light receiver for receiving visible lights output from the display areas of the display section which are reflected off an object, and a position specifying section for specifying a position of the object based on a phase difference among the reflected light received by the light receiver.

With this structure, the position of the viewer can be specified using the visible light for showing the image similarly as described in the above section (4).

(42) An image display system of the present invention is an image display system formed of an image display device and a device to be carried by a user, wherein: the image display device includes a display section which includes a light source for outputting multiple types of visible lights having different wavelengths, and which displays an image based on a visible light output from the light source, and a controller for controlling the light source such that a type of a visible light varies for each of the display areas using information for modulating an intensity with frequencies higher than the frame rate of the image; and the viewer device includes a light receiver for receiving visible lights output from the display areas of the display section which are reflected off an object, and a position specifying section for specifying a position of the object based on a phase difference among the reflected light received by the light receiver.

With this structure, the position of the viewer can be specified using the visible light for showing the image similarly as described in the above section (5).

(43) Further, in the above structure, it is preferable that: the display section is provided with a lenticular lens which is formed of convex lens bodies with the lens bodies being arranged in a lateral direction, and is attached so as to be movable in a lateral direction; the viewer device further includes sending means for sending position information of a viewer specified by the position specifying section to the image display device; the image display device further includes receiving means for receiving the position information of the viewer which is sent by the sending means; and the controller moves the lenticular lens such that the position of the viewer which is received by the receiving means is within a stereoscopic area.

With this structure, the viewer can watch a three dimensional image in a preferable state at any place without moving.

INDUSTRIAL APPLICABILITY

An image display device according to the present invention can be used for liquid crystal televisions, organic EL displays, laser projection type televisions and the like. Further, it can also be used for portable terminals having display devices.

The invention claimed is:

1. An image display device, comprising:
a display section which includes a light source and displays an image based on a visible light output from the light source; and
a controller for having the display section display the image at a predetermined frame rate, modulating an intensity of the visible light with a frequency higher than the frame rate, and having the visible light carry predetermined information;
wherein:
the predetermined information includes multiple types of information for modulating the intensity of the visible light with multiple types of frequencies higher than the frame rate;
the display section includes a plurality of display areas;
said image display device further comprises light receivers for receiving visible lights output from the display areas of the display section which are reflected off an object; and
the controller controls the light source such that visible lights having the intensity modulated using the multiple types of information are output from different display areas, and specifies a position of the object based on a phase difference among reflected light received by the light receivers.

2. An image display device according to claim 1, wherein the controller modulates the intensity of the visible light with a frequency of 1 kHz or higher.

3. An image display device, comprising:
a display section which includes a light source and displays an image based on a visible light output from the light source; and
a controller for having the display section display the image at a predetermined frame rate, modulating an intensity of the visible light with a frequency higher than the frame rate, and having the visible light carry predetermined information;
wherein:
the light sources output multiple types of visible lights each having different wave lengths;
the predetermined information includes information for modulating the intensity of the visible light at a frequency higher than the frame rate;
the display section includes a plurality of display areas;
said image display device further comprises light receivers for receiving visible lights output from the display areas which are reflected off an object; and
the controller controls the light source such that a type of the visible light having the intensity being modified varies for each of the display areas, and specifies a position of the object based on a phase difference among reflected light received by the light receivers.

4. An image display device according to claim 1, wherein:
the object is a viewer;
the display section displays a three dimensional image; and
the controller controls the display section such that the three dimensional image is displayed in such a manner that the three dimensional image is recognizable at the specified position of the viewer.

5. An image display device according to claim 1, further comprising a speaker, wherein:
the object is a viewer; and
the controller adjusts a sound volume and a phase of the speaker based on the specified position of the viewer.

6. An image display device, comprising:
a display section which includes a light source and displays an image based on a visible light output from the light source;
a controller for having the display section display the image at a predetermined frame rate, modulating an intensity of the visible light with a frequency higher than the frame rate, and having the visible light carry predetermined information; and
a light receiver for receiving light reflected off a viewer, wherein:
the predetermined information includes information for modifying the intensity of the visible light at a frequency higher than the frame rate; and
the controller detects at least one of presence/absence and movement of the viewer based on an intensity of the reflected light received by the light receiver.

7. An image display device, comprising:
a display section which includes a light source and displays an image based on a visible light output from the light source;
a controller for having the display section display the image at a predetermined frame rate, modulating an intensity of the visible light with a frequency higher than the frame rate, and having the visible light carry predetermined information; and
an image receiver for receiving an image signal, wherein:
the display section includes
a backlight as the light source, and
a spatial light modulator for spatial modulating a visible light from the backlight to display an image; and
the controller has the spatial light modulator spatially modulate in accordance with the image signal, and also modulates the intensity of the visible light output from the backlight to have the visible light carry the predetermined information.

8. An image display device according to claim 7, wherein:
the predetermined information is additional information added to the image signal; and
the controller modulates a carrier signal having a frequency higher than the frame rate with the additional information, and drives the backlight with the modulated carrier signal.

9. An image display device according to claim 7, wherein:
the predetermined information includes multiple types of information for modulating the intensity of the visible light with multiple types of frequencies higher than the frame rate;
the spatial light modulator includes a plurality of display areas;
said image display device further comprises light receivers for receiving visible lights output from the display areas of the spatial light modulator which are reflected off an object; and
the controller controls the backlight such that visible lights having the intensity modified using the multiple types of information are respectively output from different display areas and specifies a position of the object based on a phase difference among the reflected light received by the light receivers.

10. An image display device according to claim 7, wherein:
the backlight outputs multiple types of visible lights having different wavelengths;
the predetermined information includes information for modulating the intensity of the visible lights with multiple types of frequencies higher than the frame rate;

the spatial light modulator includes a plurality of display areas;

said image display device further comprises light receivers for receiving visible lights output from the display areas which are reflected off an object; and the controller controls the backlight such that a type of visible light varies for each of the display areas and specifies a position of the object based on a phase difference among the reflected light received by the light receivers.

11. An image display device according to claim 9, wherein the object is a viewer;

the spatial light modulator is provided with a lenticular lens which is formed of convex lens bodies with the lens bodies being arranged in a lateral direction, and is attached on a surface of the spatial light modulator so as to be movable in a lateral direction; and the controller moves the lenticular lens such that a stereoscopic area encompasses the specified position of the viewer.

12. An image display device according to claim 9, further comprising a speaker, wherein:

the object is a viewer; and the controller adjusts a sound volume and a phase of the speaker based on the specified position of the viewer.

13. An image display device according to claim 7, further comprising a light receiver for receiving light reflected off a viewer, wherein:

the predetermined information includes information for modifying the visible light at a frequency higher than the frame rate; and the controller detects at least one of presence/absence and movement of the viewer based on an intensity of the reflected light received by the light receiver.

14. An image display device according to claim 7, wherein the backlight is formed of light emitting diodes.

15. An image display device according to claim 14, wherein the light emitting diodes comprise red, green and blue light emitting diodes.

16. An image display device according to claim 7, wherein:

the predetermined information is additional information added to the image signal;

the backlight is a coherent light source;

the spatial light modulator spatial modulates coherent light output from the coherent light source;

the display screen includes a screen for projecting the coherent light which is spatially modulated by the spatial light modulator; and the controller has the spatial light modulator spatially modulate in accordance with the image signal, and also modulates the intensity of the coherent light to have the coherent light carry the predetermined information.

17. An image display device according to claim 16, wherein:

the controller modulates a carrier signal having a frequency higher than the frame rate with the additional information, and drives the coherent light source with the modulated carrier signal.

18. An image display device according to claim 16, wherein:

the predetermined information includes multiple types of information for modulating the intensity of the visible light with multiple types of frequencies higher than the frame rate;

the screen includes a plurality of display areas;

said image display device further comprises light receivers for receiving visible lights output from the display areas of the screen which are reflected off an object; and the controller controls the coherent light source such that visible lights having the intensity modified using the multiple types of information are respectively output from different display areas and specifies a position of the object based on a phase difference among the reflected light received by the light receivers.

19. An image display device according to claim 16, wherein:

the coherent light source includes a plurality of coherent light sources for outputting multiple types of visible lights having different wavelengths;

the predetermined information includes information for modulating the intensity of the visible lights with multiple types of frequencies higher than the frame rate;

the screen includes a plurality of display areas;

said image display device further comprises light receivers for receiving visible lights output from the display areas which are reflected off an object; and the controller controls the coherent light source such that a type of visible light varies for each of the display areas and specifies a position of the object based on a phase difference among the reflected light received by the light receivers.

20. An image display device according to claim 18, wherein the object is a viewer;

the screen is provided with a lenticular lens which is formed of convex lens bodies with the lens bodies being arranged in a lateral direction, and is attached on a surface of the screen so as to be movable in a lateral direction; and the controller moves the lenticular lens such that a stereoscopic area encompasses the specified position of the viewer.

21. An image display device according to claim 18, further comprising a speaker, wherein:

the object is a viewer; and the controller adjusts a sound volume and a phase of the speaker based on the specified position of the viewer.

22. An image display device according to claim 16, further comprising a light receiver for receiving light reflected off a viewer, wherein:

the predetermined information includes information for modifying the visible light at a frequency higher than the frame rate; and the controller detects at least one of presence/absence and movement of the viewer based on an intensity of the reflected light received by the light receiver.

23. An image display device according to claim 16, wherein:

the coherent light source is a semiconductor laser or a wavelength conversion laser; and the controller modulates a carrier signal having a frequency higher than the frame rate with the additional information, and drives the semiconductor laser or the wavelength conversion laser with the modulated carrier signal.

24. An image display device according to claim 16, wherein the coherent light source comprises red, green and blue light coherent light sources.

* * * * *

UNITED STATES PATENT AND TRADEMARK OFFICE
CERTIFICATE OF CORRECTION

| | | |
|---|---|---|
| PATENT NO. | : 7,830,357 B2 | Page 1 of 1 |
| APPLICATION NO. | : 11/658318 | |
| DATED | : November 9, 2010 | |
| INVENTOR(S) | : Yasuo Kitaoka et al. | |

It is certified that error appears in the above-identified patent and that said Letters Patent is hereby corrected as shown below:

ON THE COVER PAGE

Item (56) References Cited, on page 1, under the "U.S. PATENT DOCUMENTS" heading, "Koplar et" should read, -- Koplar et al. --

Signed and Sealed this
Fifth Day of April, 2011

David J. Kappos
*Director of the United States Patent and Trademark Office*